United States Patent [19]

Copella

[11] Patent Number: 4,906,988

[45] Date of Patent: Mar. 6, 1990

[54] OBJECT VERIFICATION SYSTEM AND METHOD

[75] Inventor: Robert A. Copella, Northbrook, Ill.

[73] Assignee: Rand McNally & Co., Skokie, Ill.

[21] Appl. No.: 148,441

[22] Filed: Jan. 26, 1988

Related U.S. Application Data

[63] Continuation-in-part of Ser. No. 6,956, Jan. 27, 1987.

[51] Int. Cl.[4] .............................................. G06K 7/00
[52] U.S. Cl. ............................ 340/825.340; 235/440;
235/449; 235/439; 235/380; 340/825.3;
340/825.31; 340/825.33
[58] Field of Search ........... 340/825.34, 825.3, 825.31,
340/825.32, 825.33; 235/493, 449, 380, 382,
450, 488, 440, 437, 432; 360/2; 369/57, 97

[56] References Cited

U.S. PATENT DOCUMENTS

| | | | |
|---|---|---|---|
| 3,599,153 | 8/1971 | Lewis . | |
| 3,636,318 | 1/1972 | Lindstrom et al. . | |
| 3,654,435 | 4/1972 | Vaccaro | 235/493 |
| 3,790,754 | 2/1974 | Black et al. . | |
| 3,860,796 | 1/1975 | Wallace et al. | 235/493 |
| 3,873,975 | 3/1975 | Miklos et al. | 235/493 |
| 3,894,756 | 7/1975 | Ward | 283/7 |
| 3,959,630 | 5/1976 | Hogberg | 250/271 |
| 3,959,631 | 5/1976 | Otten | 235/493 |
| 4,034,211 | 7/1977 | Horst et al. | 356/71 |
| 4,066,910 | 1/1978 | Swift | 235/454 |
| 4,092,526 | 5/1978 | Beck | 235/487 |
| 4,094,462 | 6/1978 | Moschner | 235/419 |
| 4,114,032 | 9/1978 | Brosow et al. | 235/493 |
| 4,215,812 | 8/1980 | Chancel | 235/493 |
| 4,218,674 | 8/1980 | Brosow et al. | 235/493 |
| 4,239,959 | 12/1980 | Gutterman | 360/2 |
| 4,303,949 | 12/1981 | Peronnet | 235/493 |
| 4,423,415 | 12/1983 | Goldman | 340/825.34 |
| 4,455,484 | 6/1984 | Whitehead | 235/493 |
| 4,469,937 | 9/1984 | Stockburger et al. | 235/435 |
| 4,547,899 | 10/1985 | Nally et al. | 235/449 |
| 4,620,727 | 11/1986 | Stockburger et al. | 235/380 |
| 4,630,845 | 12/1986 | Sanner | 340/825.34 |
| 4,649,265 | 3/1987 | Stockburger et al. | 235/493 |
| 4,656,473 | 4/1987 | Goldman et al. | 340/825.34 |
| 4,661,983 | 4/1987 | Knop | 235/494 |
| 4,734,695 | 3/1988 | Goldman et al. | 340/825.34 |
| 4,806,740 | 2/1989 | Gold et al. | 235/449 |
| 4,837,426 | 6/1989 | Pease et al. | 235/440 |

FOREIGN PATENT DOCUMENTS

| | | |
|---|---|---|
| 0128535 | 12/1984 | European Pat. Off. . |
| 2829778C2 | 1/1980 | Fed. Rep. of Germany . |
| WO/85/029-27 | 7/1985 | PCT Int'l Appl. . |
| 529398 | 11/1972 | Switzerland . |
| 569333 | 11/1975 | Switzerland . |
| 1308331 | 2/1973 | United Kingdom . |
| 1331604 | 9/1973 | United Kingdom . |
| 1336131 | 11/1973 | United Kingdom . |
| 1481902 | 8/1977 | United Kingdom . |
| 1535340 | 12/1978 | United Kingdom . |
| 1541579 | 3/1979 | United Kingdom . |
| 1546053 | 5/1979 | United Kingdom . |
| 2021835A | 12/1979 | United Kingdom . |
| 1570195 | 6/1980 | United Kingdom . |

Primary Examiner—Donald J. Yusko
Assistant Examiner—Eric Pudpud
Attorney, Agent, or Firm—Dressler, Goldsmith, Shore, Sutker & Milnamow, Ltd.

[57] ABSTRACT

Apparatus and methods of verifying objects utilize detectable characteristics of a plurality of spaced apart, magnetizable magnetic security regions affixed to the object. Magnetic characteristics for each magnetic region are detected from two different orientations. A verification apparatus senses the magnetic characteristics from two different orientations and compares it to a prestored representative profile previously created. Correspondence between the prestored profile and the currently read characteristics indicates an authentic object. Other objects can be rejected.

65 Claims, 30 Drawing Sheets

FIG. 23A
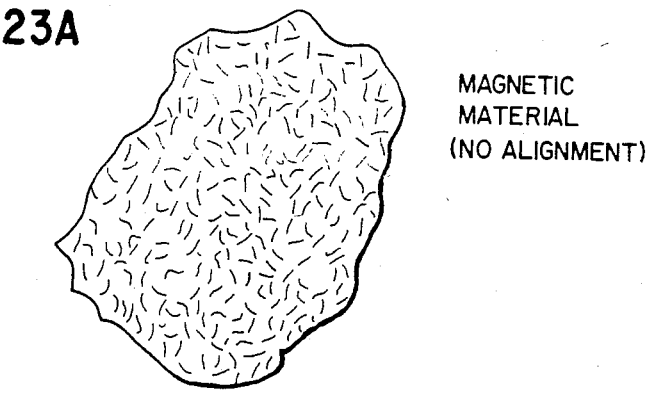
MAGNETIC MATERIAL (NO ALIGNMENT)
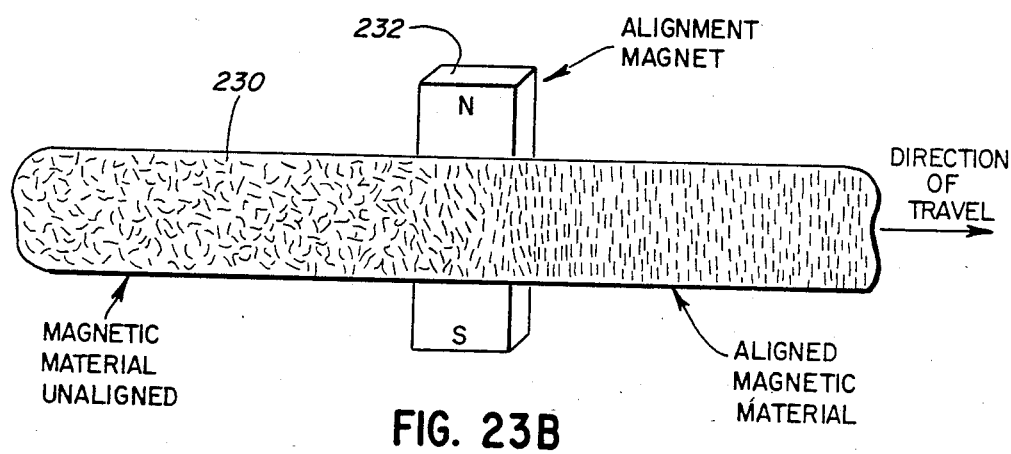
FIG. 23B
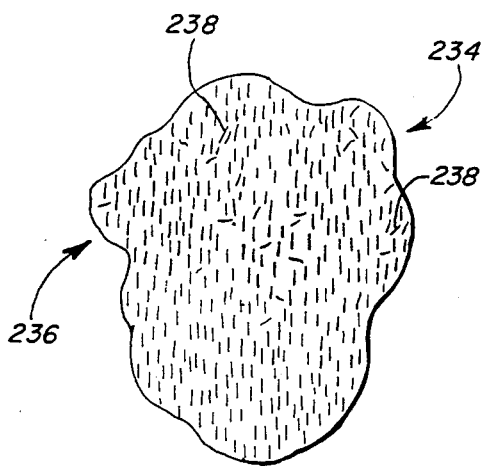
FIG. 23C
MAGNETIC MATERIAL AFTER ALIGNMENT
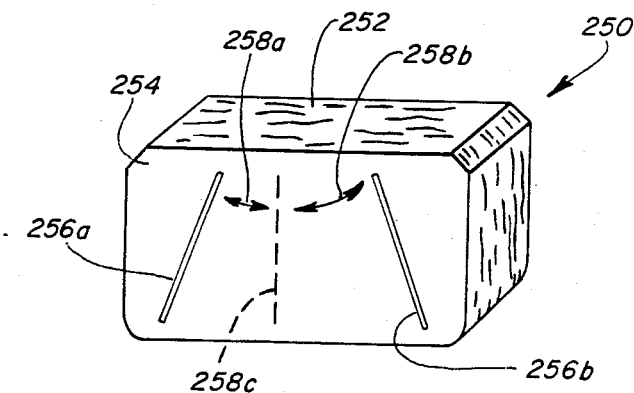
FIG. 24

OBJECT VERIFICATION SYSTEM AND METHOD

This is a continuation-in-part of patent application Ser. No. 006,956 entitled Object Verification System and Method filed Jan. 27, 1987.

FIELD OF THE INVENTION

The invention pertains to objects whose authenticity can be verified. More particularly, the invention pertains to both documents and other types of objects which carry a plurality of spaced apart magnetic regions. The magnetic regions can be used to verify the authenticity of the document or other object.

BACKGROUND OF THE INVENTION

Problems associated with the forging or counterfeiting of various types of documents are longstanding and well known. For example, forgery of negotiable instruments, currency or other documents of value is a continuing and ongoing problem to issuers of such documents.

Historically, attempts have been made to protect such documents by using special types of paper in combination with various printing techniques.

Techniques that have been developed include the use of papers which have optically discernible characteristics such as water marks. Alternately, the incorporation of planchets is well recognized in the creation of paper to be used for negotiable instruments. More recently, papers have been created that include detectable metal threads.

Printers have developed embossing techniques as well as techniques for the creation of randomly varying optically discernible characteristics which can be created during the printing process. Alternate printing techniques have included the use of special inks as well as the use of highly complex printed figures or graphics.

The verification and authentication problem extends to nondocumentary objects of value as well. For example the verification and authentication of paintings of substantial value can be a difficult, expensive and time consuming process. Similarly, the authentication of other types of nondocumentary objects which have value can also be an expensive and a time consuming problem.

Another example of objects of value where there is a continuing and ongoing authentication problem involves magnetic products such as computer disks and video tapes. Large scale and widespread copying of both of these types of objects results in substantial and ongoing losses to the producers of the authentic objects.

The widespread use of plastic credit or debit cards has created yet another set of authentication and verification problems. It is very common for such cards to include pre-recorded magnetic stripes which include transaction related information. This information can include account numbers, credit limits, and/or personal identification codes.

However, such cards have been especially susceptible to forgery in view of the fact that the magnetic encoding is almost always based on one or more publicly known standards. One such standard ANSI×4.16-1983 is utilized in connection with many pre-recorded magnetic stripes associated with such cards.

Another class of documents which suffers from similar types of forgery and alteration problems includes transportation tickets. Airline tickets represent a particularly difficult problem in that the value of a ticket may vary over several orders of magnitude depending on the length of the trip and the destination. However, the issuing agency may use the same type of document for both inexpensive short trips as well as much more expensive long trips.

Multi-use documents, such as rail transportation tickets, present yet another type of authentication problem. Such documents are magnetically alterable at the time of use to decrease the remaining value of the card. However, if an original, unused document can be both physically and magnetically duplicated to create a usable counterfeit document, the issuing agency can lose substantial proceeds.

Various systems are known which can be utilized to create and authenticate verifiable documents or credit cards. Some of the known systems are optically based. Others are magnetically based.

One known type of system is disclosed in U.S. Pat. No. 4,423,415 issued to Goldman. The system of the Goldman patent makes use of the fact that paper documents have a randomly varying translucency characteristic. The randomly varying translucency is a natural characteristic which results from the process of manufacturing the paper.

In Goldman's system radiant energy, for example a beam of visible light, is directed at a selected portion of a document. The amount of light which passes through the document, as the document is being moved with respect to the beam, can be sensed. The document thus becomes a light modulator.

Because of the nature of the process of making the paper medium, no two documents will have the same variable translucency characteristic. As such, the sensed light which passes through each document can be used as a unique identifier of the document.

In accordance with Goldman's system, a representation of the sensed variable translucency characteristic is recorded on the document prior to use. When the document is placed into use, the variable random translucency characteristic is again optically sensed. The sensed characteristic is compared to the representation of the sensed characteristic previously pre-recorded on the document.

In the case of an authentic document, the translucency characteristic sensed at the time of use will correspond in a predetermined manner to the translucency characteristic pre-recorded on the document at the time of creation. A forged document on the other hand, based on a different piece of paper, will not have a sensed characteristic that corresponds to the pre-recorded representation unless the forger has a corresponding set of equipment and knows the details of creation of the authentic document.

A variation of the above described Goldman system is disclosed in U.S. Pat. No. 4,476,468. In this patent, also issued to Goldman, a light dispersing coating is deposited on a surface of a card or other document. Reflected light from the card is sensed and used to create a unique indicia for the document. This indicia can be recorded on the card for later verification purposes. The system of U.S. Pat. No. 4,476,468 can be used with opaque documents since it depends on sensing a reflected light beam. On the other hand, the system of the above-noted U.S. Pat. No. 4,423,415 requires a document which is at least in part translucent.

Alternate optically based systems are illustrated in U.S. Pat. Nos. 4,034,211 and 4,094,462 issued to Host et al. and Moschner respectively. The systems of the Host et al. and Moschner patents utilize a defraction grating affixed to an optically accessible portion of the card or document. Light reflected off of the defraction grating can be sensed and used to form a randomly varying document characteristic. This document characteristic can be encoded on the card for later verification purposes.

U.S. Pat. Nos. 4,114,032 and 4,218,674 both issued to Brosow et al. disclose systems which use fibers of a magnetic or a magnetizable material. The surface of the document can be coated with such fibers or the fibers can be added to the base material of the document when it is being manufactured. In accordance with systems of the Brosow et al. patents, the presence of the discrete magnetic fibers can be sensed over a portion of the document. The number of sensed fibers can be used as a document identifier. This number can be stored on the card for later comparison during the verification process.

U.S. Pat. No. 4,303,949 issued to Peronnet discloses a magnetically based verification system. The system of the Peronnet patent utilizes a magnetic stripe with a thickness that varies in discrete increments along the length of the stripe.

One way that is disclosed to form discrete thickness variations is to use a two layer stripe. One of the layers is a continuously extending layer. The other layer is a discontinuous layer applied above or below the continuously extending layer. At the time of verification, a signal is written to the multi-layer stripe. The resultant magnetization is then sensed. The physically permanent multi-layer structure results in a certain magnetization characteristic each time that the signal is applied to the stripe. The resultant magnetization characteristic can then be sensed in a read head. Then the stripe can be erased.

The Peronnet patent also discloses forming a stripe with discretely varying thickness increments by removing discrete amounts of material from a very thick stripe. This results in a stripe that has two or more regions with substantially different thickness. For example, the Peronnet patent refers to thickness increments greater than 40% of the base thickness.

U.S. Pat. No. 3,790,754 issued to Black et al. discloses a magnetic verification system that utilizes two different types of magnetic material. One type has a coercivity that is greater than the other type. According to the system of the Black et al. patent, in a preferred mode, two sets of magnetic ink are used to print interleaved bars having different magnetic characteristics. The bars can be sensed to form a digital number usable to identify the document.

While the known systems would appear to be effective with respect to verification of certain types of objects, each has certain limitations. The optically based systems require translucent or reflective surfaces. Many objects, such as credit cards, are not translucent. Other types of objects, such as disks or video tapes are not suitable for self-verification via the use of reflected light systems. Further, many types of products such as sports equipment or clothing do not have the necessary physical characteristics to utilize the known systems.

Known magnetic systems result in increased manufacturing costs and manufacturing complexity. In addition, special inclusions, modifications, magnetic regions or layers distinct from the normal read-write magnetic tracks are often needed.

Hence, there continues to be a need for an authentication/verification system of more general applicability to a variety of objects. Such a system preferably would be very inexpensive and would be integrally includable in the object without requiring that the object have particular physical characteristics.

SUMMARY OF THE INVENTION

In accordance with the invention, a method usable for verification of the authenticity of an object is provided. The object has a plurality, of spaced apart magnetizable magnetic regions positioned thereon. The magnetic regions each include a randomly varying magnetic characteristic. The plurality of randomly varying magnetic characteristics is unique to the object.

The method includes the steps of detecting the randomly varying characteristic of each of the magnetic regions, processing the plurality of detected characteristics to form a profile, retrieving a prestored representation of that profile and comparing the newly generated profile of the magnetic regions to the prestored profile. The result of that comparison can also be provided as one of the steps of the method.

In one form of practicing the method, the randomly varying characteristics can be detected in a plurality of single layer regions of magnetic material which is provided only for that purpose. Alternately, the plurality of spaced apart magnetic regions can be used to record transaction related information.

The prestored representation of the processed randomly varying magnetic characteristics can be retrieved from a selected location on the object. For example, it could be recorded optically on the object. One suitable place on the object is in the spaces between magnetic regions. Alternately, the prestored representation could be retrieved from a centralized data base.

An apparatus can be used for verifying the authenticity of an object which carries a plurality of spaced apart magnetizable magnetic regions. The apparatus detects a randomly varying magnetic characteristic in a plurality of the regions. This composite characteristic is unique to the object. The apparatus includes a magnetic detector, such as a read coil, which senses the randomly varying characteristic of a plurality of the spaced apart magnetic regions as the object passes by the read coil.

A prestored representation of the processed characteristics can be carried on another part of the object and can be detected by appropriate detection circuitry. Alternately, the prestored representation of the characteristics can be retrieved from a centralized data base. The apparatus can also include comparison circuitry for comparing the processed profile or representation of the detected randomly varying characteristics to the retrieved, prestored profile or representation of those characteristics.

In accordance with the invention, a method of making a verifiable object includes a step of providing a base portion. The base portion can be flexible or rigid. In addition, the base portion can assume a variety of shapes and can comprise a variety of types of documents.

A plurality of spaced apart regions of magnetic material can be deposited on the object. The regions of magnetic material can be formed as a plurality of elongated and spaced apart rectangular members. Alternately, the regions of magnetic material could be formed in any preselected shape.

A unique, permanent and randomly varying magnetic characteristic of each of a plurality of the spaced apart regions is then sensed. These sensed characteristics are used to form a unique profile or representation which can be readily encoded either on the object or stored in a central data base. The representation can be stored on the object in optically visible form which is machine readable. One such form is bar code format. Alternately, the profile or representation can be recorded onto a selected region of magnetic material.

A system for making a verifiable object includes apparatus for applying a plurality of spaced apart, single layer regions of magnetic material on the object. The regions of magnetic material can be preformed as rectangularly shaped bars. Thirteen to seventeen bars can preferably be used. Alternately, the regions can be formed by applying spaced apart coatings in the form of an ink or the like to the object. The coating or ink can carry the magnetic material in combination with a liquid medium or vehicle. The vehicle can be evaporated or dried to provide a plurality of solid, spaced apart regions of magnetic material affixed to the object.

A unique, permanent and randomly varying magnetic characteristic of each of the magnetic regions can be sensed by means of a read coil. A unique encoded profile or representation of the sensed characteristic can be formed. This unique profile or representation of the sensed characteristic can be printed onto the object by means of a bar code printer. Alternately, the unique representation could be recorded or written onto a section of a recordable magnetic region by a recording head.

Further in accordance with the invention, a verifiable object can be provided. The verifiable object includes a base region. The base region can be flexible or rigid. The base region can be in the form of a document. Alternately, the base region could be in the form of a utilitarian object such as a computer disk or a video tape, or even an object such as a tennis racket.

The object also includes a plurality of spaced apart regions of magnetic material. The members of the plurality are positioned on the base portion. In one form of the invention, the regions of magnetic material can be deposited as a coating or layer of ink which can then be dried and hardened. Alternately, a preformed tape carrying the spaced apart regions can be affixed to the base portion. The region can be formed as a single layer.

The regions of magnetic material are magnetizable. Each comprises a permanent, randomly varying magnetic characteristic. The plurality of randomly varying characteristics is unique to the object. To enhance the detectability of the randomly varying magnetic characteristic, a saturation level magnetic field can be used to align the magnetic material in the spaced apart regions.

The magnetic field can be generated by a permanent magnet or an electrically energized coil. A magnetic field 5 or 6 times that needed to saturate the magnetic regions will preferably be used.

In yet another form of the invention, a verifiable object can have a base portion that supports the spaced apart regions of magnetic material. A profile or representation, perhaps in digital form, of the processed non-uniform magnetic characteristics unique to the object can be carried by the base portion, displaced from that characteristic. This representation can by used later in the verification phase by comparison with a new reading of the region.

Further, the magnetic material can be deposited with first and second portions. The first portion can be used for the purpose of encoding or recording selected transaction related information. A second, nontransaction, portion can also be provided. The second portion is displaced from the first portion but may be immediately adjacent thereto. The second portion extends for a selected distance and includes the plurality of spaced apart magnetic regions. In a preferred form of the invention, the magnetic regions will all have the same coercivity.

In yet another form of the invention, a verifiable document can be provided. The document can include a flexible or rigid substrate. The substrate can be translucent, opaque or transparent. The verifiable document includes a plurality of spaced apart magnetic regions on the substrate. The regions may be formed by applying them as a single layer slurry which is then cured.

To enhance the detectability of the varying magnetic characteristics of the regions, a non-varying magnetic field can be applied to the regions by moving the document past a magnet. A processed profile or representation of the varying magnetic characteristics can be carried by the substrate. This profile or representation can be in the form of information recorded on a portion of a magnetic stripe. Alternately, the representation can be in the form of optically visible characters formed on the substrate.

In yet another form of a verifiable object, the application of the magnetic material coating can be adjusted such that the coating is applied in a single layer but non-uniformly. Finally, additional magnetic material can be selectively sprayed against the substrate.

Numerous other advantages and features of the present invention will become readily apparent from the following detailed description of the invention and the embodiments thereof, from the claims and from the accompanying drawings in which the details of the invention are fully and completely disclosed as a part of this specification.

DESCRIPTION OF THE DRAWINGS

FIGS. 22B and 23A illustrate the randomly distributed magnetizable particles.

FIGS. 23B and 23C illustrate the alignment of the otherwise randomly oriented particles.

FIG. 24 illustrates a sensor 250 usable with the magnetic security elements 212.

DETAILED DESCRIPTION OF THE PREFERRED EMBODIMENT

Figure 1A:
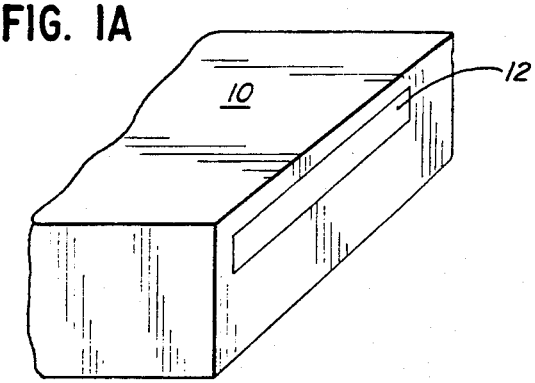
FIG. 1 is a perspective view of a fragment of a verifiable object.
FIG. 1B is a planar view of a verifiable document.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

FIG. 1A illustrates a verifiable object 10 having an arbitrary shape with a recordable magnetic region 12 thereon. The region 12 is formed as a single layer and continuously extends over a selected distance. The region 12 contains a randomly varying magnetic characteristic unique to the object.

Figure 1B:
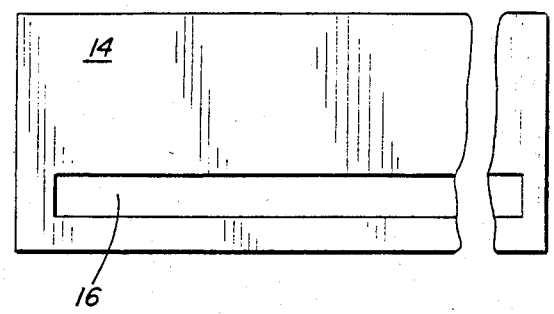

FIG. 1B illustrates an alternate to the object 10 of FIG. 1A. Object 14 is a document. Formed on the documentary object 14 is a single layer, continuously extending recordable magnetic region 16. The region 16 also contains a detectable randomly varying magnetic characteristic unique to the object. The region 16 can be used to authenticate or identify the document 14 just as the region 12 can be used to authenticate and identify the object 10.

This randomly varying magnetic characteristic is a result of the fact that regions of magnetic material of the type found useful in magnetic recording are not formed with perfectly uniform magnetic characteristics. Rather, such regions of magnetic material have randomly varying detectable characteristics. The detectability of these characteristics can be enhanced and used for authentication of or identification of the objects 10, 14 to which the regions 12, 16 are affixed.

Recordable magnetic materials even in an erased state, display a detectable permanent residual characteristic that can be used for identification and authentication purposes. If an erased strip of recordable magnetic material is moved past a read head of a conventional variety, this residual characteristic can be sensed and converted to a unique time-varying voltage. This voltage can be stored in any convenient form and then can be compared to a voltage generated subsequently off of the magnetic region. The object to which the magnetic region is attached can then be authenticated.

It will be understood that the object to which the region of magnetic material is affixed is not a limitation of the present invention. The object can be opaque, translucent, transparent, rigid or flexible. The present invention is particularly advantageous in this regard. Provided that a region of magnetic material as discussed below can be affixed to the object, the object can be uniquely authenticated and identified.

It will be understood that the shape of the object 10 or 14 to which the magnetic stripe 12 or 16 is affixed is not a limitation of the present invention. Nor, is the shape of the magnetic region notwithstanding the fact that rectangular stripes 12 and 16 are illustrated.

Further, it will be understood that the inherent, detectable randomly varying magnetic characteristic can be further enhanced by a variety of techniques. For example, an underlying, random magnetic pattern can be deposited perhaps by printing, on the substrate. The magnetic layer can be deposited over the magnetic pattern. Alternately, portions of the magnetic section 24 can be physically altered by means of embossing or scratching or other methods of removal of a portion of the magnetic material as to create a more readily detectable characteristic. Yet another alternate includes spraying, in a random fashion, magnetic material onto or beneath the magnetic section 24.

Figure 2:
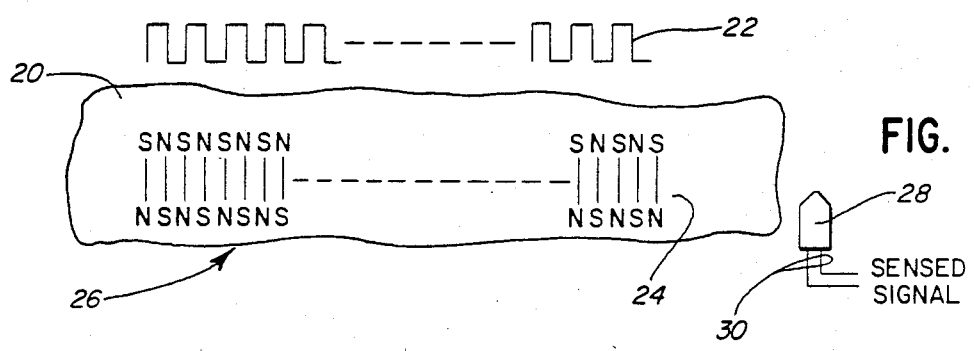
FIG. 2 is an enlarged, planar, fragmentary view of a portion of a magnetic region illustrating schematically a recorded signal thereon.

FIG. 2 illustrates a portion 20 of a region of magnetic material such as the region 12 or the region 16. For purposes of explaining the present invention, and without limitation, a discontinuous, periodic and symmetric digital signal 22 has been recorded along a section 24 of the region 20. The signal 22 when recorded on the section 24 enhances and fixes the detectability of the randomly variable magnetic characteristic. The recorded signal 22 can then be permanently carried by the section 24. Alternately, the signal 22 can be erased and rewritten onto the magnetic region as described subsequently.

Altering the location where the signal 22 is recorded on the section 24 or altering the form of the enhancing signal 22 results in enhancing different parts of the randomly varying magnetic characteristic.

For example, while a periodic signal 22 has been illustrated, a non-periodic signal that can be used is a recorded data track on a charge, credit or debit card. While initially used to record information, such signals also enhance portions of a unique random magnetic characteristic of the stripe on such cards. Thus, the present verification method can be used to verify presently known cards or other documents that carry magnetically recorded information.

The recorded signal 22 has been recorded in a known format referred to as F2F or NRZI. This format is self-clocking and known to be usable for magnetic recording. The recorded signal 22 is represented symbolically on the region 24 by a plurality of spaced apart bar magnets 26 oriented oppositely with respect to one another to reflect the continuously reversing polarity of the signal 22. It will be understood that FIG. 2 is schematic and the precise arrangement of the recorded magnetic regions will depend on the location and orientation of the write head.

Using standard magnetic techniques, the section 24 can be moved past a sensor or read head 28 of a standard variety. This movement will induce an electrical signal in the read head 28 due to the variations in the magnetic region 24 and the pre-recorded enhancing signal 22.

A sensed electrical signal can be detected on a pair of wires 30 coupled to the read head 28. The sensed signal on the lines 30 is in part proportional to the orientation of the magnetic material in the section 24 which results from recording the signal 22 thereon and is in part proportioned to the random magnetic characteristic of the non-uniform magnetic stripe. In a preferred form, the signal 22 is saturation recorded onto the magnetic region. The effect of saturation recording is to enhance and therefore maximize the detectability of the random magnetic characteristic.

The magnetic stripe 12 or 16 can be deposited on an underlying substrate in a variety of ways. For example, a slurry or coating or ink including powdered magnetic material can be deposited on a moving web in a printing press. The slurry can then be cured, as dried and hardened, creating a fixedly attached magnetic stripe which is an integral part of the underlying substrate. Alternately, a flexible substrate having an adhesive backing on one side and a magnetic layer deposited on the other side can be fixedly attached to the underlying object. Thus, it will be understood that the exact mechanism by which the magnetic region is affixed to the underlying object is not a limitation of the present invention.

The magnetic stripes 12 or 16 as described above can all be formed with a substantially uniform thickness. For purposes of the present document, thickness variations due to normal manufacturing variations on the order of 10% or 15% will still come within the definition of the phrase "substantially uniform thickness."

The magnetic stripes 12 or 16 as described above can be formed of a single type of magnetic material. Further, no particular orientation need be imparted to the magnetic particles during the manufacturing process.

Figure 3A:
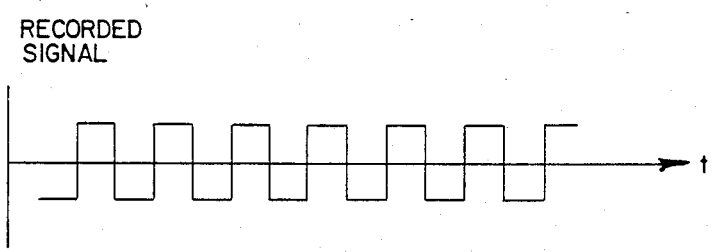
FIG. 3A is a plot of a varying enhancing, digital signal as a function of time.
Figure 3B:
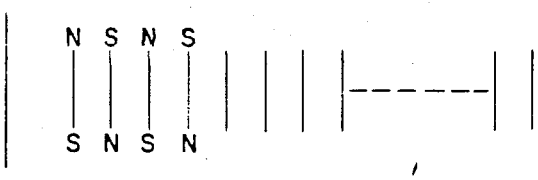
FIG. 3B is a schematic spatial plot of the alignment of magnetic regions in response to recording the enhancing signal of FIG. 3A on a magnetic layer.
Figure 3C:
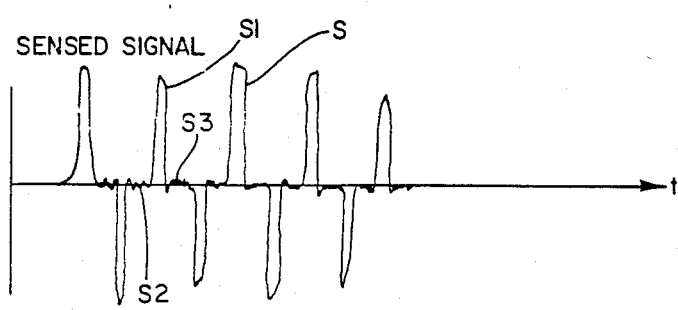
FIG. 3C is a plot of a randomly varying analog signal sensed off of the recorded magnetic layer of FIG. 3B enhanced by the signal of FIG. 3A.

FIG. 3A is a plot of an exemplary recorded signal, a symmetrical, discontinuous periodic digital signal 22 as a function of time. FIG. 3B is a schematic representation of the orientation of the magnetic material on the section 24 due to the signal 22 saturation recorded on the section 24. FIG. 3C illustrates a plot of the sensed signal S on the lines 30 which is generated by the read head 28 as the section 24 moves past that head.

With respect to the plot of the sensed signal S in FIG. 3C, it should be noted that transitions which are generated on the lines 30 occur as each of the oriented magnetic regions moves past the read head. Further, it should be noted that the peak values of the sensed signal are not regular. Rather, they are continuously varying because of the randomly varying characteristics of the magnetic material in the stripe. The peak values are a function of the amount and characteristics of the magnetic material at each of the locations on which the recorded signal 22 is saturation recorded. It is the peak random variations of the sensed signal S illustrated in the graph of FIG. 3C which are an indication of the continuous randomly varying magnetic characteristic of the region 24. If a non-periodic signal is used, such as would be present on a pre-recorded information track, the randomly varying peak values of the sensed output signal will also be non-periodic.

The sequence of maximum values of the sensed signal represents a measure of a unique, randomly varying magnetic characteristic which is not repeated and which varies from one magnetic region to the next. The sensed signal S illustrated in FIG. 3C can be detected, processed and utilized to create a unique profile for the object. This profile can be used for later comparison with profile signals sensed off of the magnetic strip 16 in the same region so as to determine the authenticity of the object. Each of these peak values, in FIG. 3C such as 51, is interposed between low values 52, 53 that correspond to first and second reference values on the order of zero volts.

Impressing the digital signal onto the region 24 results in enhancement and improved detectability of the randomly varying magnetic characteristic. It will be understood that the invention is not limited to the use of periodic, saturation recorded enhancing digital signals. A non-periodic digital signal saturation recorded could also be used as could a time-varying analog signal to enhance the varying characteristic to facilitate its ease of reading. Both saturation and non-saturation recording of the enhancing signal can be used.

Figure 3D:
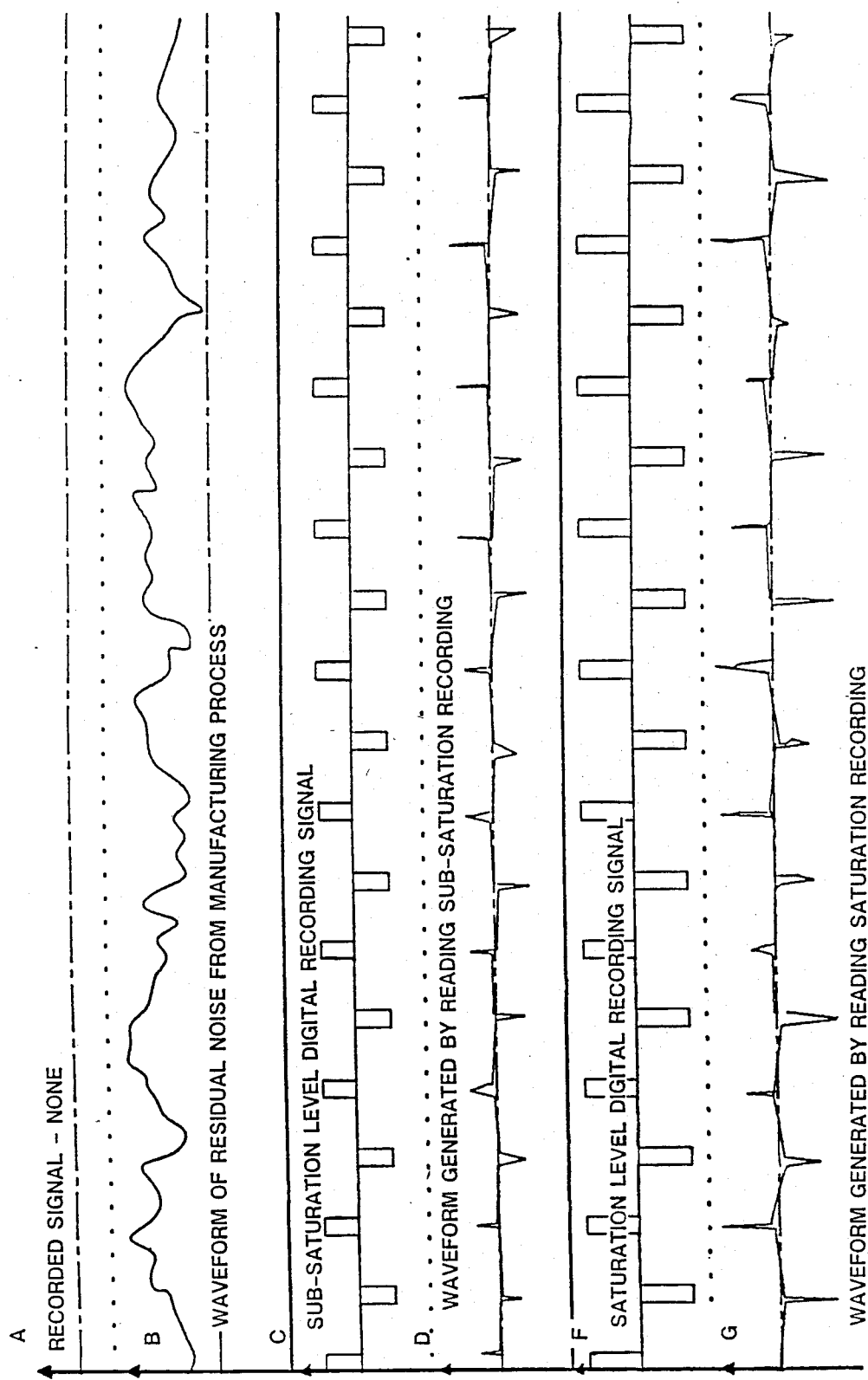
FIG. 3D is a family of plots of waveforms illustrating effects of using different enhancing signals on the detectability of a common randomly varying magnetic characteristic.

FIG. 3D is a graph of a plurality of plots illustrating the use of enhancing signals to detect the inherent randomly varying characteristic of the magnetic material. Plot A of FIG. 3D illustrates the absence of a recorded signal on a magnetic medium. Plot B illustrates the output from a read head, such as the read head 28, perhaps amplified, as the magnetic medium is moved past the read head. As can be seen from plot B a continuously varying noise level can be sensed. This noise level is inherent in the medium and is repeatable on subsequent rereading of that section of the magnetic material. As noted above, this unenhanced randomly varying waveform of plot B can be recorded and used in subsequent verification of the medium.

Plot C illustrates a subsaturation digital signal recorded on the magnetic medium. While illustrated as a periodic signal in plot C, it will be understood that the effect of the subsaturation level of the digital recording signal will be the same for an aperiodic recording signal. Plot D illustrates a time varying sequence of signals sensed off the read head and subsequently amplified. As can be seen from plot D, the random variations of plot B now appear as random variations in the peak values of the sensed signals from plot D.

Plot F illustrates a digital recording signal with a level great enough to saturate displaced portions of the magnetic region during the recording process. Plot G illustrates the sensed variations of the saturation recorded digital signal of plot F. As can be seen from plot G, the randomly varying peak values in many instances have amplitudes which are greater than the amplitudes of the waveform of plot D. Any of the waveforms illustrated in plots B, D or G could be used for the purpose of creating a representative profile of that particular magnetic region. That profile could be stored and subsequently compared to a later read signal generated off the same portion of the magnetic region. The same magnetic region will generate comparable randomly varying characteristics. As can be seen from the plots D and G, the level and the location of the recorded enhancing signal determines the amplitude and characteristics of the randomly varying magnetic characteristic that are detected for verification purposes.

Figure 3E:
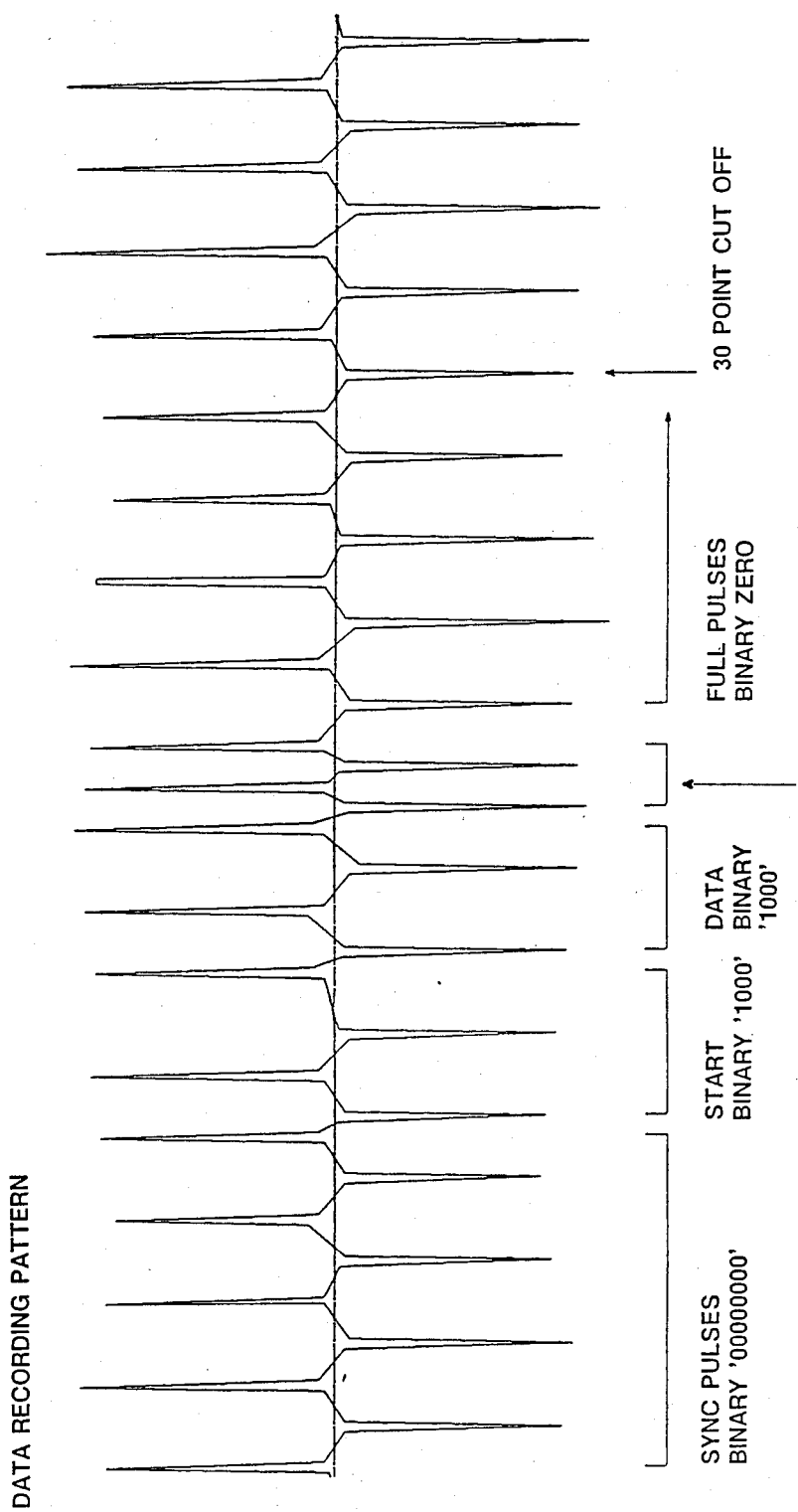
FIG. 3E is a plot illustrating a randomly varying magnetic characteristic enhanced by a saturation recorded, a periodic enhancing signal.

To further illustrate the versatility of the present method of using various enhancing signals, FIG. 3E illustrates an amplified plot sensed off of a read head such as the read head 28 where the enhancing signal is an aperiodic digital signal, saturation recorded on the medium. With reference to FIG. 3E, a 30 bit digital, aperiodic recording signal was saturation recorded onto a selected magnetic medium. Using hexadecimal notation, the recorded bit sequence was 0088F00 followed by two binary zeros. To the right of the 30 bit sequence a plurality of zeros has been saturation recorded.

The aperiodic nature of the 30 bit saturation recorded enhancing signal is apparent on FIG. 3E due to the varying spacing between the signals generated in the read head as the magnetic medium passed adjacent to it. Further, as can be seen from FIG. 3E the peak values of the signals exhibit a randomly varying pattern of the type discussed previously in plot G of FIG. 3D.

The plot of FIG. 3E could have been read off of a conventional data track of an existing credit, debit, charge or identification card. In normal sensing of the pre-recorded information, the noted peak variations would be ignored. Notwithstanding the fact that a very well-known form of document has been sensed, it is a particular advantage of the present invention that the peak sensed values can be used, as described subsequently, to form a representative profile which can be utilized for verification purposes.

In one embodiment, once recorded on the section 24, the enhancing signal is not erased. It is permanently carried by the object. The verification process will utilize the signal pre-recorded on the section 24.

Alternately, if a "start" mark or indicia is carried by the object the enhancing signal can be recorded starting at that indicia. The profile can be detected, stored and then the enhancing signal can be erased. Later, when verification is to be carried out, the enhancing signal can be re-recorded using the "start" indicia for purposes of locating where the recording should be made. The profile can then be re-created and compared to the stored representation. The process of re-writing the enhancing signal at the point of verification will increase the security of the verification process.

In yet another embodiment two profiles can be created. One profile can be based on a signal 22 recorded on the magnetic material especially for security purposes. A second profile can be created using a data signal, pre-recorded on a data track. Hence, a dual comparison can be made at the point of verification.

The location of the recorded signal on the magnetic material in part defines the characteristics of the sensed signal S. Changing the location of the recorded signal or changing the characteristics of the recorded signal will result in sensing a different randomly varying magnetic characteristic.

Once the sensed signal S on the lines 30 has been detected, it can be digitized and processed. Signal processing as described subsequently, can be used both for purposes of data compression and for purposes of profile comparison.

Figure 4:
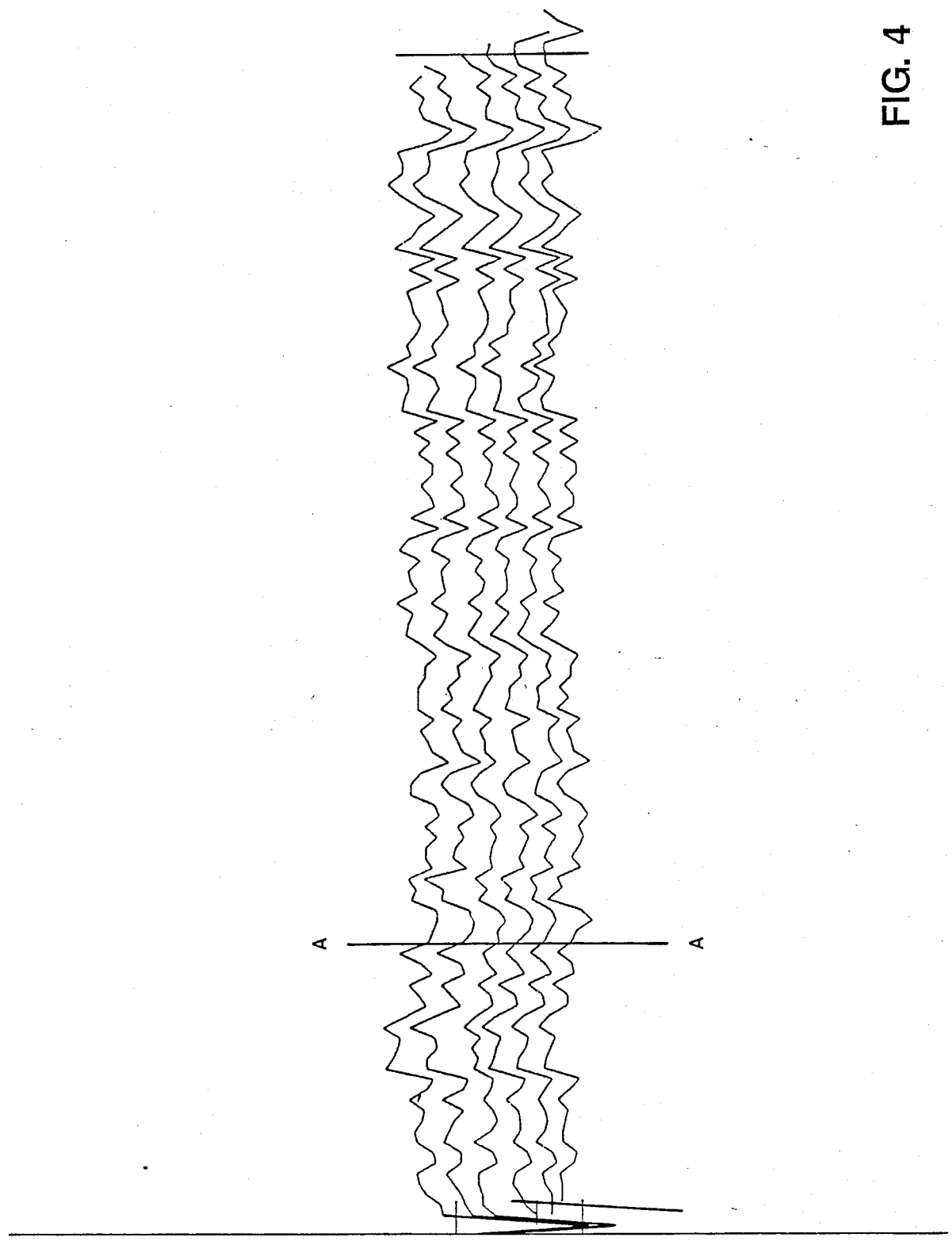
FIG. 4 is a family of six plots of the sensed and processed random magnetic characteristic in the same region of a single object.

FIG. 4 is a graph of six processed signals corresponding to sensed signals on the lines 30. The six plots illustrated on FIG. 4 represent six passes of the same magnetic region, such as the region 24, past a read head 28. This sensed magnetic region was about 2.6 inches long.

The magnetic region noted above had a discontinuous digital signal 30 bits long saturation recorded on it with the bit pattern illustrated in FIG. 3E. The graph left of the line A—A is a representation of a processed profile created from those 30 data points. To the right of the line A—A is a processed profile based on, a 100 bit periodic enhancing wave form such as the waveform 22 that was recorded on the magnetic material.

In each instance, the raw sensed absolute magnitudes of the detected sensed signal have been processed so as to create a usable plot with a compressed data representation. In each instance, the six sensed signals were sensed in the same magnetic region and were processed in precisely the same manner, as will be described subsequently. As can be seen, a very high degree of similarity exists between each of the plots of FIG. 4. Hence, any one of the representations of FIG. 4 could be used as a unique identifier of the corresponding magnetic region.

Figure 5:
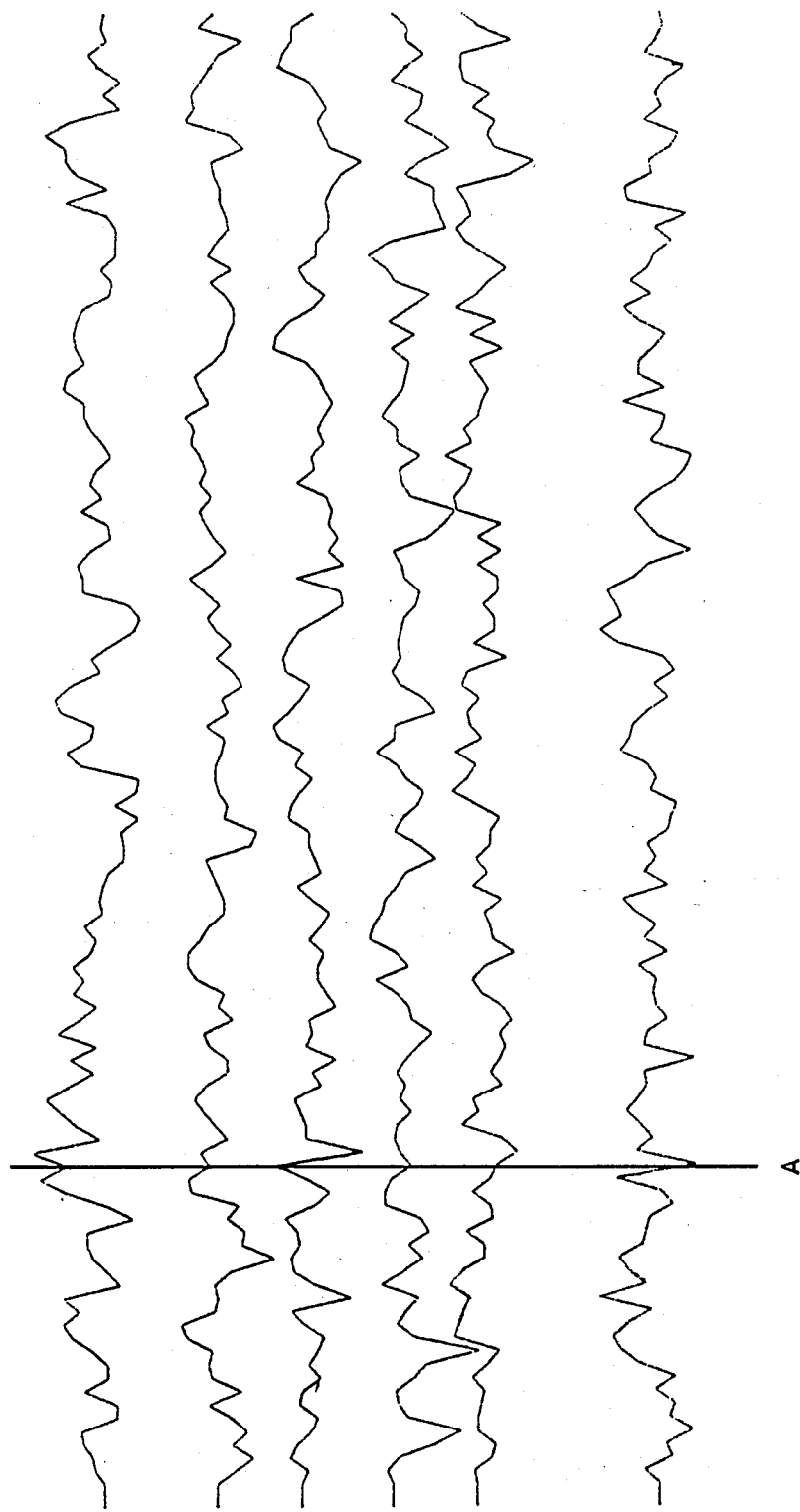
FIG. 5 is a family of six plots of the sensed and processed random magnetic characteristic of six different objects.

In contradistinction, FIG. 5 is a graph of six plots of processed, sensed signals for six different magnetic regions. Each of the six regions had the same 30 bit nonperiodic and 100 bit periodic enhancing signals recorded thereon. Each of the plots of FIG. 5 represents a sensed signal detected on the wires 30 and processed in exactly the same fashion. Each of the plots in FIG. 5 was processed in the same way as was each of the plots of FIG. 4. As can be noted from FIG. 5, each of the processed representations is substantially different from every other representation on FIG. 5.

The differences in the plots in FIG. 5 illustrate the differences in the sensed, inherent randomly varying magnetic characteristic of each of the different magnetic regions. Each of the magnetic regions represented by the plots of FIG. 5 was on the order of 2.6 inches long.

For example, and without limitation, the type of magnetic material used to form the sensed region such as the region 24 was ferric oxide imparticle form such as $Fe_2O_3$ particles. This magnetic material can be formed into a stripe such as the stripes 12 or 16 having a length of about 5.5 with a width of about 1.585 inches.

Figure 6:
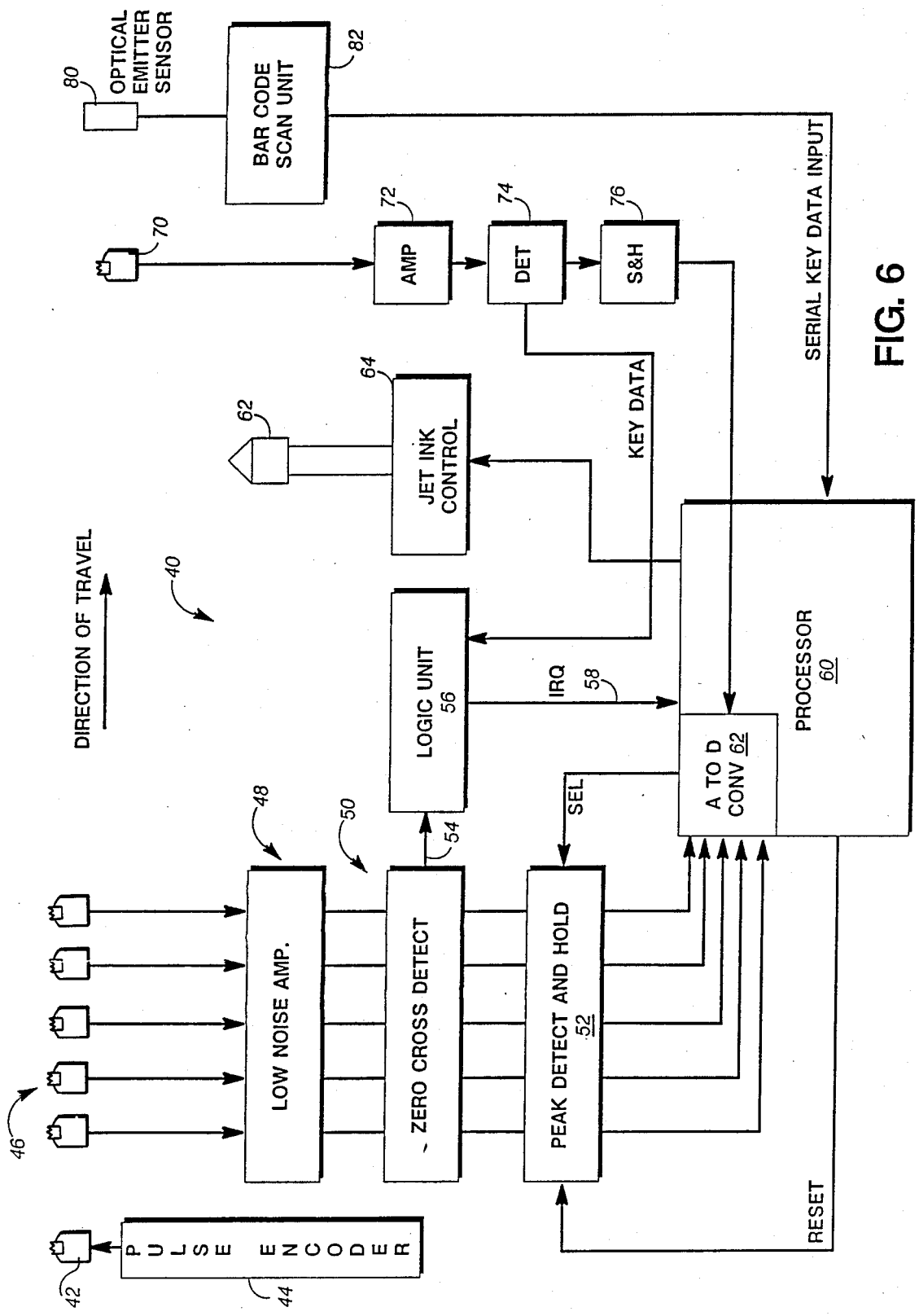
FIG. 6 is a block diagram schematic of a profile sensing and encoding apparatus.

FIG. 6 illustrates an apparatus 40 usable for the purpose of encoding a magnetic region 24 with an enhancing signal corresponding to the digital signal 22, sensing the enhanced randomly varying magnetic characteristic, and recording a representation of that characteristic on the object. The apparatus 40 includes a magnetic write head 42 driven by a pulse encoder 44. As a magnetic region, such as the region 24 moves pass the write head 42, the pulse encoder 44 is rotated. The rotation results in the write head 42 writing the digital signal 22 onto the magnetic region 24 at a rate of either 75 pulses per inch or 210 pulses per inch. Both 75 and 210 pulses per inch are standard writing densities used with commercially available magnetic materials. Non-standard recording densities may also be used.

Immediately subsequent to writing the signal 22 onto the magnetic region 24, a plurality of spaced-apart read heads 46, for example five, reads the enhanced random magnetic characteristic of the region 24. Members of the plurality of read heads 46 read the random characteristic in parallel. Output from each member of the plurality of read heads 46 is coupled to a member of a plurality of low noise amplifiers 48 for amplification purposes. There is one amplifier available for each read head. The plurality of low noise amplifiers 48 is coupled to a plurality of zero crossing detectors 50. In addition, the plurality of low noise amplifiers 48 is also coupled to a plurality of peak detecting sample and hold circuits 52.

Each member of the plurality of zero crossing detectors 50 is coupled to a respective member of the plurality of low noise amplifiers 48. Similarly, each member of the plurality of sample and whole circuits 52 is coupled to a respective low noise amplifier.

With reference to the sensed analog signal, such as is illustrated in plot G of FIG. 3D, the members of the plurality of sample and hold circuits 52 sense and hold a peak value read by the corresponding one of the read heads 46. On the immediately following zero crossing, the corresponding member of the plurality of zero crossing detectors 50 senses the zero crossing and generates a control signal on one of a plurality of control lines 54 which feeds a logic and control unit 56. The logic and control unit 56 generates an interrupt signal on an interrupt request line 58 of a programmable processor 60.

The processor 60, in turn, causes an analog to digital converter 62 to convert the respective sensed peak value of the respective sample and hold circuit of the sample and hold circuits 52 into a digital representation. As the magnetic section 24 moves past the plurality of read heads 46, a corresponding plurality of peak digitized values is collected by the processor 60 for each of the five read heads.

The five sets of peak values, which are proportional to the enhanced randomly varying magnetic characteristic of the region 24 can be correlated and converted to a representative profile for subsequent use.

The representative profile generated from the five sets of peak values can then be recorded on the object in one of several different forms. For example, the profile can be encoded on the object 10 or the document 14 by means of a bar code printer 62. The bar code printer 62 can be coupled to the processor 60 by control circuitry 64. Alternately, the profile could be encoded on a portion of the magnetic stripe 12 or 16 displaced from the region 24 in standard magnetic recording format.

The bar code printer has the advantage that a machine readable representation is available which does not take up any portion of the magnetic stripe. On the other hand, encoding the profile on a portion of the magnetic stripe can provide enhanced security.

The apparatus 40 also includes a validation read head 70. The purpose of the validation read head 70 is to provide an immediate rereading of the sensed magnetic region 24 as the object moves through the apparatus 40. Output from the read head 70 is coupled, via an amplifier 72 to a zero crossing detector 74 and a peak sample and hold amplifier 76. On detection of a zero crossing by the detector 74, the logic and control unit 56 generates an interrupt request on the line 58 to the processor 60.

The processor 60, in turn, converts the output of the peak sample and hold circuit 76 to a digital representation so as to recreate the profile of the magnetic region 24. The recreated profile can then be compared to the previously created representative profile for purposes of checking the document.

As a further validation step, the bar code previously printed on the object can be sensed at an optical sensor 80. The sensor 80 is in turn coupled to a bar code scanning unit 82. The scanning unit 82 is in turn coupled to the processor 60. The processor 60 can then compare the sensed and encoded representation of the representative profile to the profile sensed at the validation read head 70. Assuming that there is a correspondence between the two profiles, the object has been properly encoded for authentication purposes and can be removed from the apparatus 40.

It should be noted that during the encoding process as described above, the magnetic stripe 12 or 16 need not be affixed to the related object. If desired, the encoding process can be completed and then the magnetic stripe can be attached to the respective object 10 or 14.

The apparatus 40 of FIG. 6 can be implemented of commercially available components and circuits. Pulse encoder elements 42 and 44 are available as a Magtek unit MT150. Magnetic read heads 46 and 70 are available as a Magtek unit MT211. Low noise amplifiers 48 and 72 can be implemented from circuits found in a publication entitled "*Encyclopedia of Electronic Circuits*" by Rudolf F. Graf published by Tab Books 1985. The zero crossing detectors 50 and 74 as well as the peak detect sample and hold circuits 52 and 60 can be found in the same publication. The processor 60 can be implemented as a Motorola MC68HC11 or an IBM personal computer. The ink jet control and printer unit 62, 64 is available as a Diconix Admark unit. The bar code reading units elements 80 and 82 are available as a Hewlett Packard unit BCS-7100.

Figure 7A:
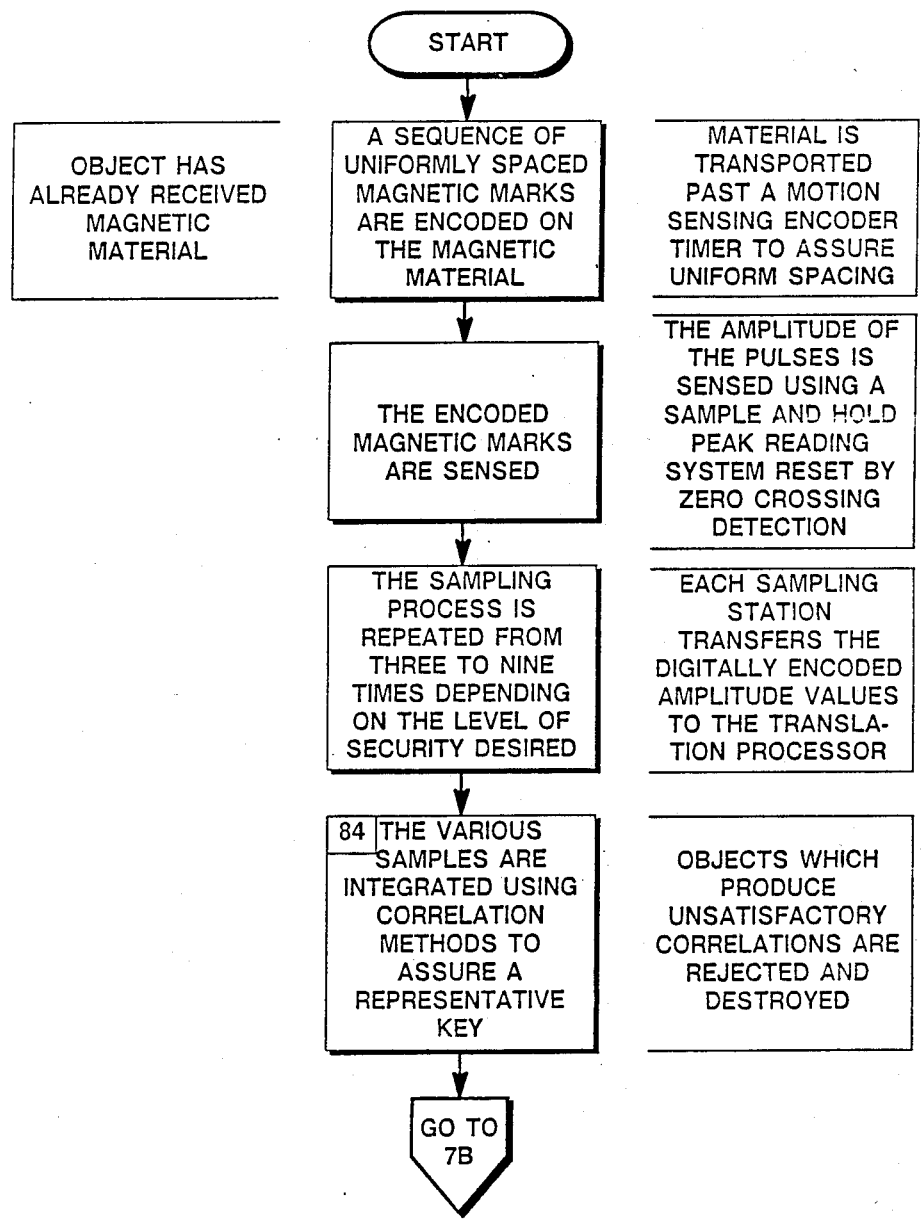
FIGS. 7A and 7B are a flow chart of the steps of a method of sensing and encoding a profile.
Figure 7B:
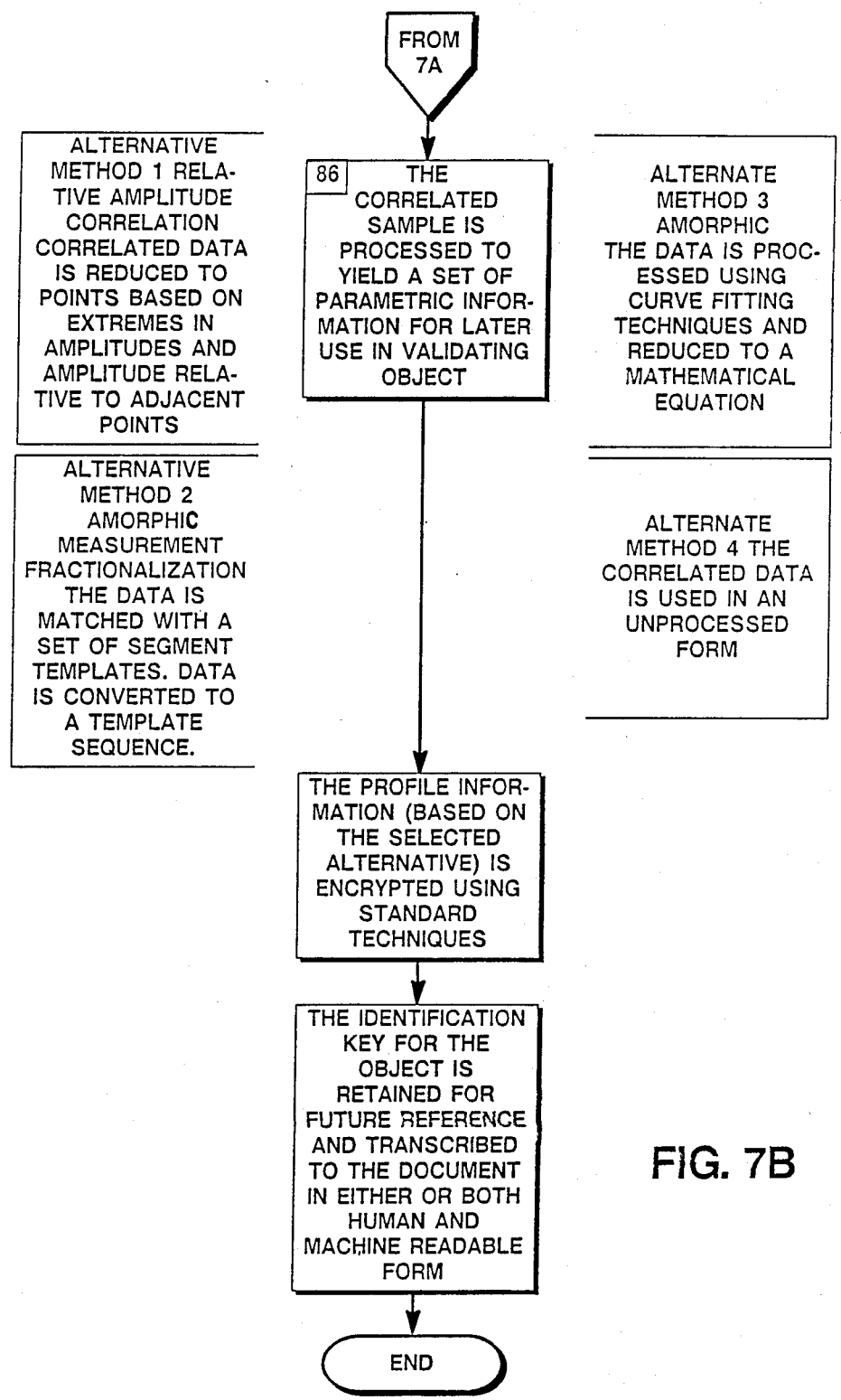

FIGS. 7A, 7B are a flow chart of the steps of the method carried out by the apparatus 40 previously described. At the start of the method, a sequence of uniformly spaced magnetic regions are encoded on the magnetic material. The uniformly spaced magnetic regions are created by the pulse encoder in combination with the write head 42. This corresponds to writing the enhancing signal 22 onto the magnetic region 24.

The encoded magnetic regions are then sensed. For example, in the apparatus 40 sensing is carried out by the plurality of profile read heads 46. The sensing process can be repeat in parallel from 3 to 9 times depending on the desired level of security. In the apparatus 40 the randomly varying profile is detected five times. Five pluralities of data points are created.

A representative key or profile is then formed in a step 84 based on the five sets of separately sensed values. In the event that the digital values which have been separately sensed cannot be correlated, the object or magnetic region can be immediately rejected. The correlated representative profile is then processed in a step 86 so as to create a compressed parametric representation which can be readily recorded on the object for subsequent verification purposes. Alternately, the parametric form of the representation can be retained in a centralized data base instead of written on the object.

FIG. 7B illustrates a plurality of possible forms of parametric representation. In Method 1, a type of delta modulation is used to compress the representative profile into a sequence of displacement values based on relative relationship to adjacent points of maximum amplitude. In Method 2, the processed profile can be encoded into a sequence of predetermined shapes. In this form of encoding, the profile can be represented in a phonetic fashion by a plurality of the geometric shapes corresponding to the shapes of segments of the profile. A sequence of shapes can then be used to represent a processed profile.

In Method 3, a representative profile, curve fitting techniques can be used to produce a mathematical representation of the profile. Finally, as in Method 4, the processed profile can be used directly in digital form.

If desired, the encoded representative profile can then be encrypted for enhanced security. The encrypted profile can then be recorded on the object either in optically visible or nonoptically visible machine readable form for later verification purposes.

It should be noted that in the event that it is desirable to record the encoded representation on the object in human readable form which is also machine readable, a variety of representations can be used. For example, OCR fonts can be used, magnetic ink character fonts can be used, and/or bar codes can be used.

Figure 8:
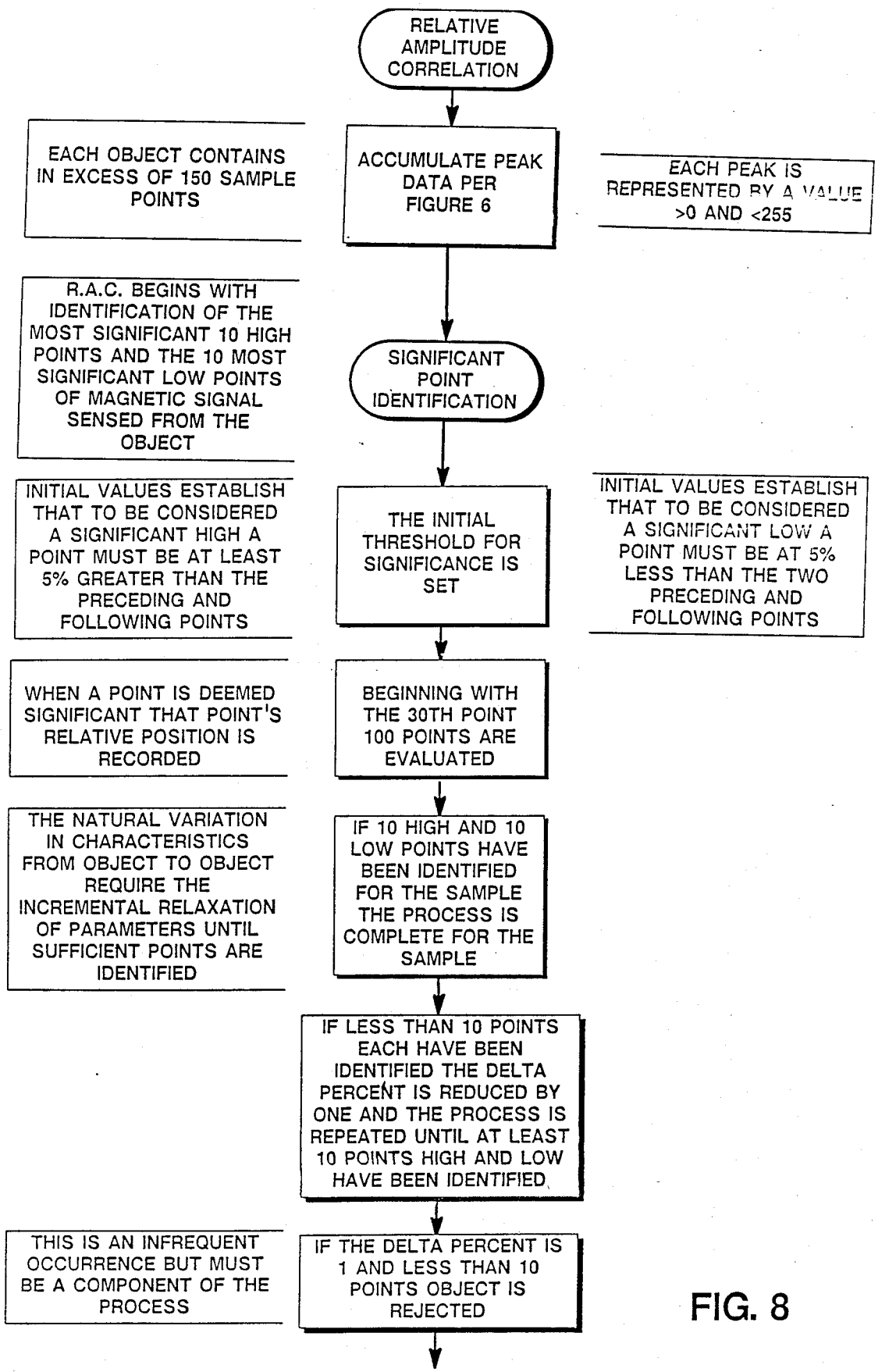
FIG. 8 is a flow chart of the steps of a method of forming a representative profile.

FIG. 8 is a flow chart illustrating the details of the integration step 84 of FIG. 7A. In accordance with the flow chart of FIG. 8, the five sets of detected data points are accumulated. Each set of data points contains in excess of 150 sample points. The most significant 10 high data points and the most significant 10 low data points are identified for each of the five sets of sample points.

An initial threshold is set to establish that a significant high is defined as a point which is at least 5% greater than the two proceeding and following points. Similarly, an initial threshold is set that requires a significant low to be at least 5% less than the two preceding and following data points. The initial 30 data points are ignored. The evaluation to determine the 10 most significant high points and the 10 most significant low points is started at the 30th point.

One hundred points are evaluated in this process. If 10 high and 10 low points have been identified after an evaluation of 100 sample points the process is completed for that particular sample. If less than 10 significant high points and 10 significant low points have been identified for the sample the 5% threshold is reduced by 1% and the process is repeated. Each time the 100 data points are evaluated for a given sample and less than 10 highs and less than 10 lows have been identified within the preceding iteration, the threshold is reduced another 1% and the process is again repeated.

If the threshold is equal to 1% and less than 10 significant highs and 10 significant low points have been identified then the object is rejected. Otherwise, the identified points of a given sample are compared to the identified points of the other samples. Identified highs or lows which are significant in at least three of the samples are retained for use in forming the representative profile. If less than 10 high and 10 low key values have been identified as significant by at least three of the samples, the object is rejected. If more than 10 high or 10 low points are significant in at least three of the samples, only the first 10 of the high and the first 10 of the low points are used for development of the profile or key.

Figure 9:
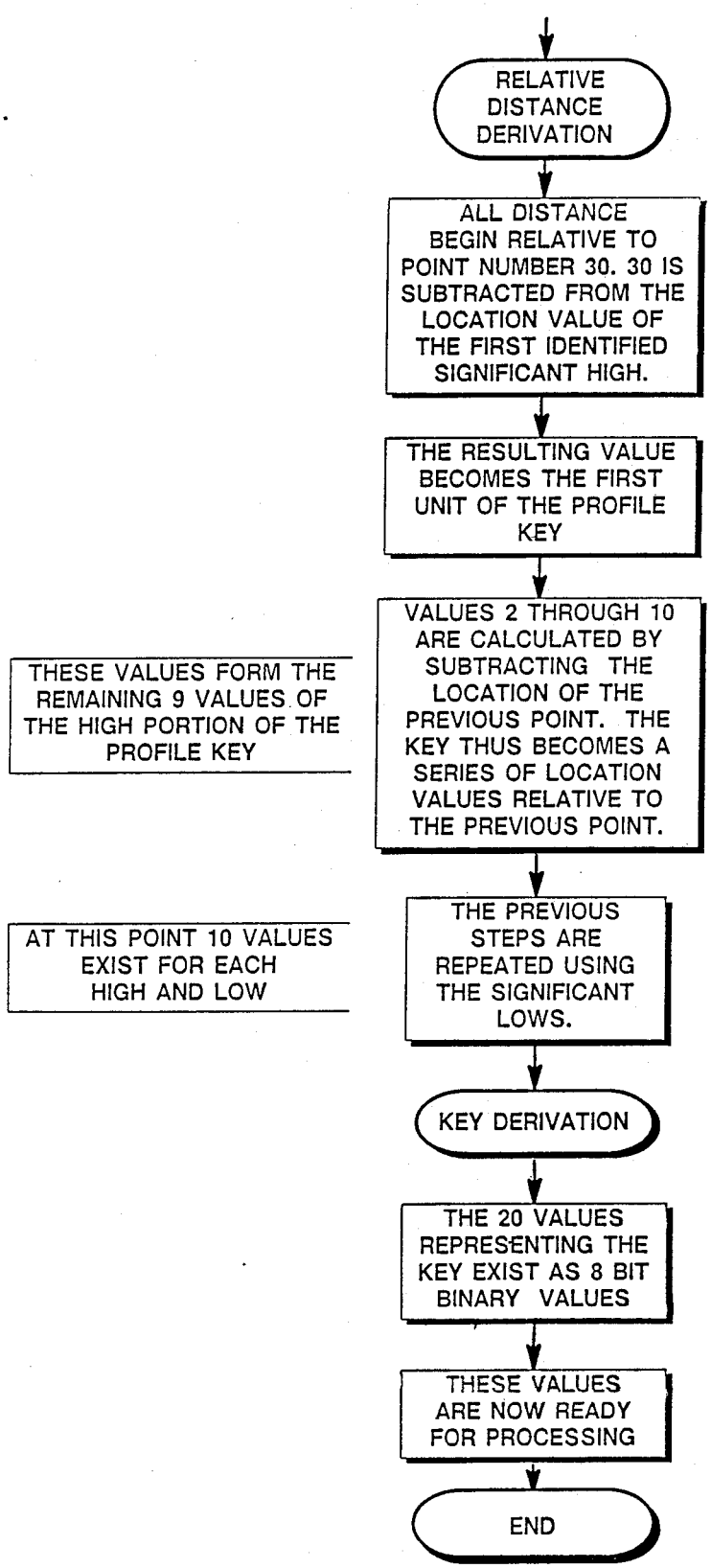
FIG. 9 is a flow chart of the steps of a method of encoding a representative profile for later use.

FIG. 9 is a flow chart of step 86 using Method 1, the relative amplitude correlation, to encode the representative profile or key. It should be noted that the relative amplitudes do not appear in the representation of the profile. Rather, only the relative displacements between the significant high and low points which have been identified are used to create the encoded profile.

Since the first 30 data points have been passed over in the evaluation of the data points, a value of 30 is subtracted from the location value of the first identified significant high data point. The resulting value becomes the first unit of the encoded profile or key. Displacement values 2–10 are calculated by subtracting the location of the previous significant high point. The encoded key or profile is thus a series or sequence of location values or increments relative to the previous point. After the incremental values for the 10 significant high data points have been determined, the incremental displacements for the 10 low significant data points are then determined. The sequence of displacements which has been formed represents the encoded key or profile. This sequence of values can now be encrypted as desired. Further, it can be recorded elsewhere in the magnetic material or on the object.

Figure 10:
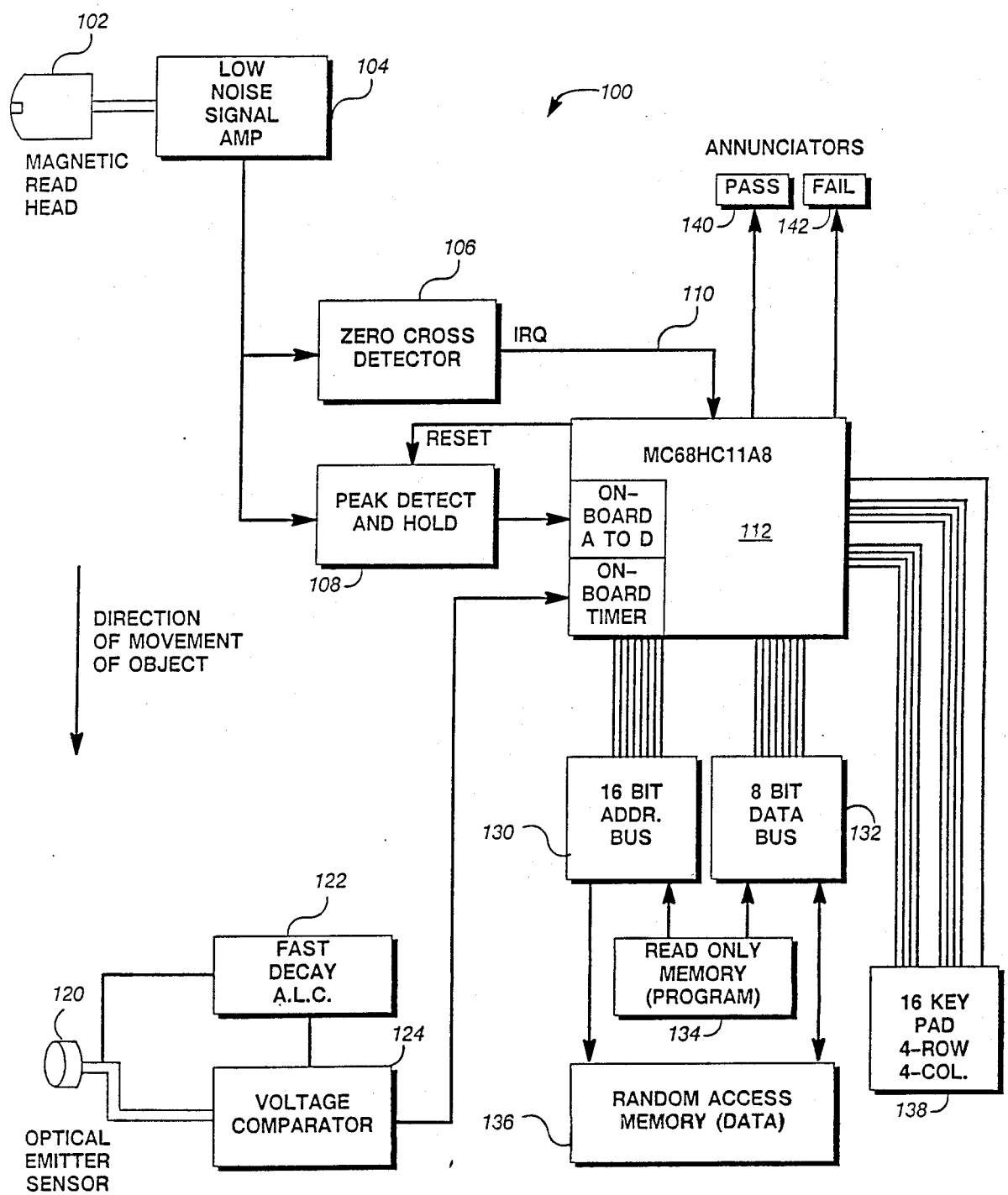
FIG. 10 is a block diagram schematic of an object verification apparatus.

FIG. 10 is a block diagram of a validator 100 which can be used to determine the authenticity of a given object 10 or 14 with an affixed magnetic stripe such as stripe 12 or stripe 16. The purpose of the validator apparatus 100 of FIG. 10 is to sense the randomly varying magnetic characteristic of a magnetic section, such as the section 24, affixed to an object and to also read from the object a pre-recorded encoded form of the representative profile initially created for the object. The validator 100 then performs a comparison between the sensed randomly varying magnetic characteristic which has been digitized and processed and the prestored digitized representative characteristic.

It will be understood that while the prestored representative characteristic can be encoded on the object as described above, it need not be. It is within the spirit and scope of the present invention to locate the prestored representative characteristic in a centralized data base which could then be supplied to the validation apparatus 100, perhaps by telecommunications, for comparison purposes.

The validator apparatus 100 includes a magnetic read head 102 of a conventional variety. The read head 102 can be either the 75 or the 210 bit per inch recording density type. The read head 102 is coupled to a low noise amplifier 104. The output of the low noise amplifier 104 is in turn coupled to a zero crossing detector 106 and a peak detect and hold circuit 108. Output from the zero crossing detector 106 generates a sequence of interrupts on an interrupt request line 110 which is an input to the programmable processor 112. In preferred embodiment, the processor 112 can be a Motorola type MC68HC11A8. Output from the detect and hold circuit 108 is coupled to an analog to digital converter which is integral with processor 112.

As the object moves past the read head 102, a sequence of maxima are detected and digitized by the processor 112. The processor 112 then forms a representation of the profile in digital format which can be compared to a prestored representation of the representative profile.

As the object moves past the magnetic read head 102 the object also passes in front of an optical sensor 120. The sensor 120 both emits a beam of radiant energy and senses reflected radiant energy from an optical pattern affixed to the object. The optical pattern which represents the previously formed representative profile can be affixed to the object in bar code format, or OCR format. Output from the sensor 120 via automatic level control circuitry 122 and comparative circuitry 124 provides a digital input to the processor 112 which represents the pre-recorded representative profile. The prior art teaches a wide variety of techniques and processes for conversion of this digitized optical signal into units of data such as numbers and/or letters.

Also coupled to processor 112 via a 16 bit address bus 130 and an 8 bit data bus 132 are read only memory modules 134 and random access memory modules 136. A control program can be loaded into the read only memory modules 134. The random access memory module 136 can be used for temporary data storage during the validation process.

The validation apparatus 100 also includes a manual input 16 key keypad 138 for operator control purposes. Two annunciators, a pass annunciator 140 and a fail annunciator 142 are provided which can generate optical and audio indicia indicating whether the validation process has detected an authentic object or a nonauthentic object.

With respect to the apparatus 100 of FIG. 10, the magnetic read head 102 can be a Magtek type MT211. Low noise amplifier 104, zero crossing detector circuit 106 and peak detect sample and hold circuit 108 are from the above-identified book the *Encyclopedia of Electronic Circuits*. The bar code sensing circuitry 122 and 124 can be implemented with a Hewlett Packard BCS-7100 module. Read only memory module 134 can be implemented with a type 27C64 circuit. Random access memory module 136 can be implement with HD6264LP modules. Keyboard 138 can be implemented with a PIPO communications model P3. Indicators 140 and 142 can be green and red light emitting diodes respectively.

A particular advantage of the present invention is found in that even if the document 14 is folded or creased, thereby disturbing the characteristic of the magnetic region 24, the document may still be verifiable. This is because the profile is sensed off of only a small portion of the total stripe 16. Hence, the probability of distorting the characteristics of the magnetic region 24 at precisely the region where the profile is being sensed is relatively low.

Figure 11A:
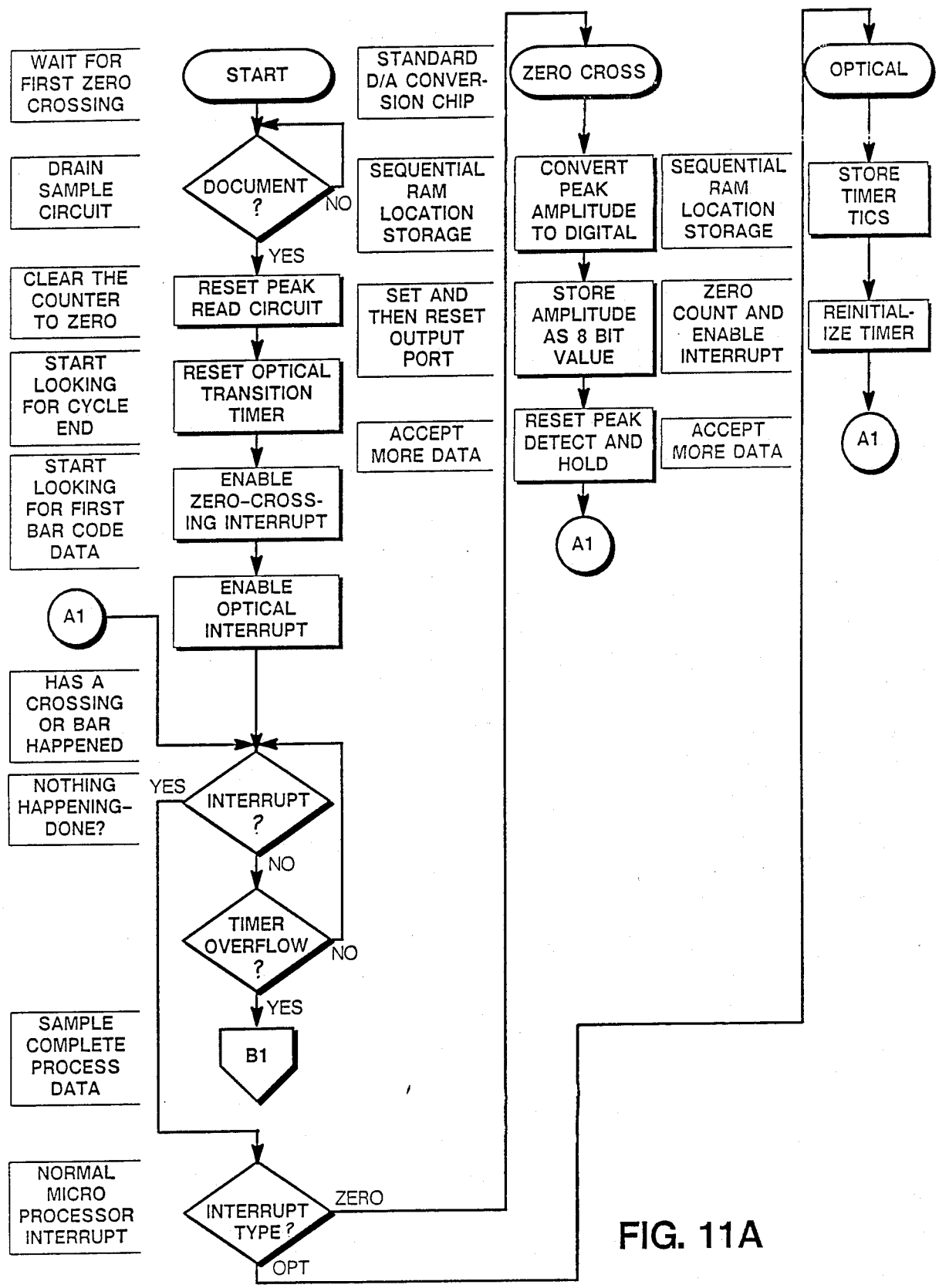
FIGS. 11A and 11B are a flow chart of the steps of a method of validating an object.
Figure 11B:
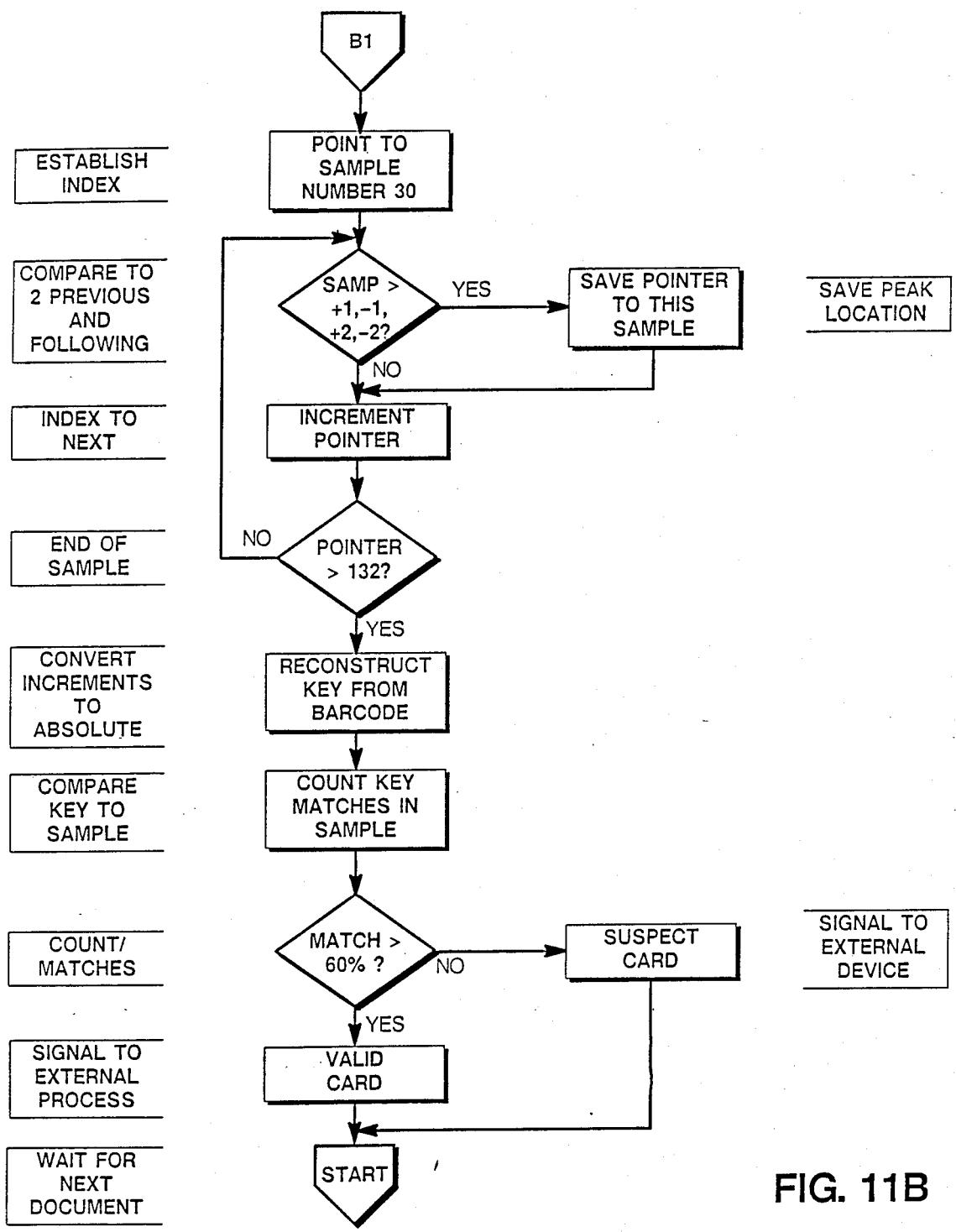

FIGS. 11A and 11B are a flow diagram of a control program storeable in the read only memory 134 of the validation apparatus 100 and usable for the purpose of controlling the validation process. In accordance with the flow diagram on FIG. 11A, the process is initiated by sensing an initial zero crossing in the zero crossing detector 106 as the object, is moved passed the magnetic read head 102. After sensing an initial interrupt on the interrupt request line 110, a time out optical transition timer is initialized by the processor 112. Further, the interrupt request line 110 from the zero crossing detector 106 is initialized. An optical interrupt from the optical sensor 120 is also initialized.

Upon sensing an interrupt, its type is detected. In the event that it is a zero crossing as is generated from the magnetic read head 102, the last peak values sensed is converted to a digital representation and stored as a digitized peak value. The peak detect and hold circuitry 108 is reset and the processor 112 waits until the next interrupt is detected.

In the event that an optical interrupt is detected, the timer value is stored and the processor 112 then returns and waits for a further interrupt to be sensed. When the timer overflows indicating that the sample is complete, the data is then processed as illustrated in FIG. 11B. Each digital peak value is compared to two previous and two following locations to obtain the peak location position. This process is iteratively repeated a number of times until 132 sample points have been examined. The optically sensed, previously stored, representative profile is then compared to the current profile. If there is a match a valid object has been detected. If there is a mismatch, the object is probably not valid.

The extent of match required can be varied based on the degree of security needed. For example, it has been found that with documentary objects with a stripe 16 formed from a slurry deposited during the printing process that adequate security is achieved with a match on the order of 60% or more between the presently sensed digitized magnetic characteristic and the previously stored representative profile.

Further, it will be understood that a magnetic region can be formed with two or more intermixed materials having different magnetic characteristics. As a result of forming a magnetic region including two or more magnetic materials, can be utilized to create a magnetic region having two different detectable profiles. Such an arrangement will provide for an especially high degree of security and verification.

As an alternate to the objects 10, 14 which carry a magnetic region, objects which are magnetic products can also be verified. For example, magnetic tapes or computer disks both rigid ad floppy can be verified. A selected electrical signal can be recorded on an unused portion of the magnetic product. The resultant enhanced characteristic can then be sensed. A representative profile can be formed and encoded. The encoded representation can be written onto the object or stored in a central data base for subsequent verification purposes.

Figure 12:
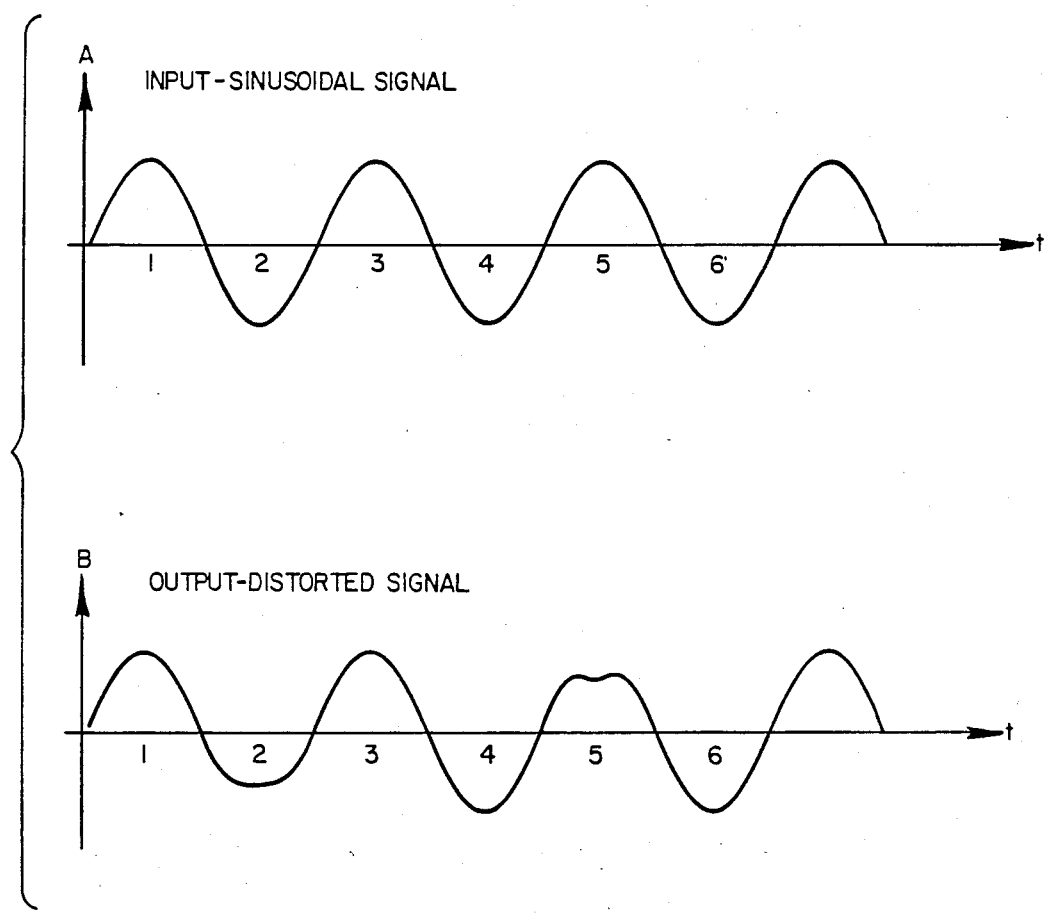
FIG. 12 is a plot of an alternate, analog enhancing signal and a corresponding output signal illustrating a randomly varying magnetic characteristic of a magnetic product such as a video tape.

FIG. 12 is a graph illustrating use of the present verification system in connection with a magnetic product, such as a magnetic tape. In this instance, a sinusoidal signal as is illustrated in plot A of FIG. 12 could be used for purposes of enhancing the detectable randomly varying magnetic characteristic of the magnetic region. The sinusoidal signal of plot A is recorded on a selected region of the magnetic tape near but not exceeding the saturation level of the tape.

Plot B of FIG. 12 illustrates an output sensed off of the region of the tape on which the enhancing signal of plot A was recorded. As illustrated in plot B, regions 1, 3, 4 and 6 of the output signal faithfully reproduce the input sinusoidal signal. Regions 2 and 5 of the output signal represent distortions of the corresponding regions 2 and 5 of the input signal.

The distortions in portions 2 and 5 of the output signal can be detected since the form of the input, prerecorded, sinusoidal signal is known. These detected randomly varying characteristics can be stored as discussed previously and used to create a representative profile. Subsequently, when it is desired to verify the authenticity of the magnetic tape, the corresponding region can again sensed. The distorted sensed signal can be compared to the stored representative profile. Comparable distorted representations indicate a valid or authentic product.

In the present embodiment, the location of the applied enhancing signal can be specified or determined in a variety of ways. For example, the tape can be physically marked by punching a hole therein or by disturbing the magnetic medium so as to provide a location defining indicia. Alternately, the location of the enhancing signal can be specified electronically. For example, in the case of a video tape the enhancing signal can be written into a location in a predetermined frame on the tape. For verification purposes, the physical location per se need not be known so long as the particular frame on the tape can be located. Similar techniques can be used with other types of magnetic products such as computer disks.

This embodiment is independent of the frequency of the pre-recorded enhancing signal. For example, the enhancing signal could have a frequency in the 12-15 Hz range. Alternately, a 50 KHz could also be used.

It will be understood that in addition to being usable with credit or charge cards, the present verification apparatus and method can be used with debit cards or with multi-use value cards wherein each use decreases the remaining value of the card. This latter category includes multi-use transportation cards.

With respect to creation of a representative profile, it will be understood that depending on the value of the object to be authenticated, more read heads or more data points can be used without departing from the spirit and scope of the present invention. What is important is that the profile creation process be as independent as possible of the speed the object moves past the read had or heads and the calibration of the devices being used.

Figure 13A:
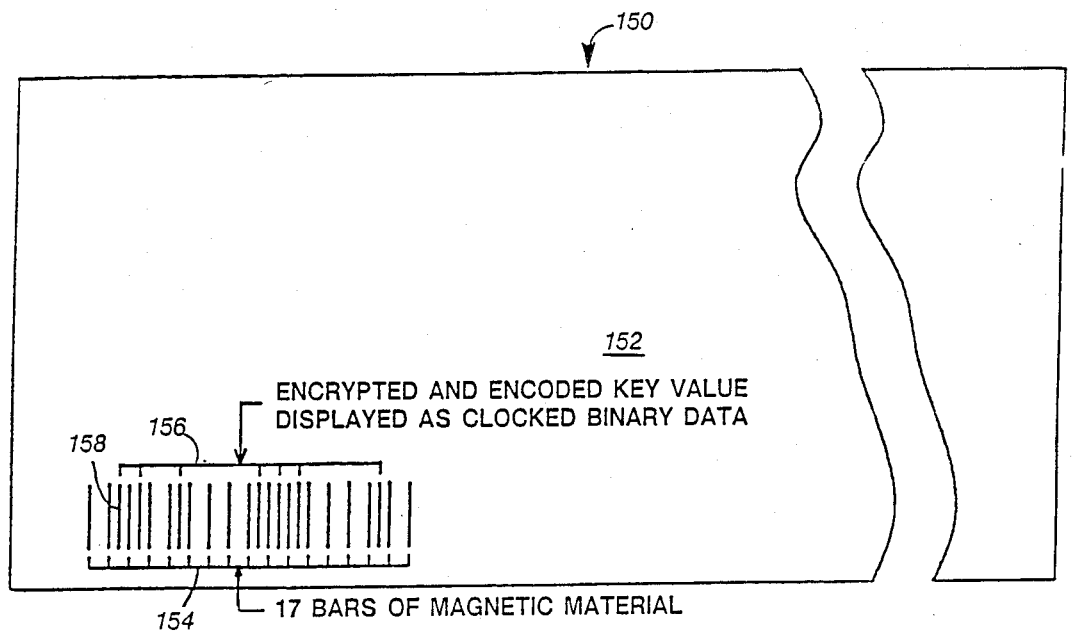
FIG. 13A and 13B is a planar view of a verifiable object with a plurality of magnetic regions in accordance with the present invention.

FIG. 13A illustrates a verifiable object 150. The object 150 includes a substrate 152. On the substrate 152 are formed a plurality of spaced apart magnetic regions 154. In the embodiment of FIG. 13A seventeen rectangularly shaped, spaced apart bars or regions of magnetic material are illustrated. Each of those regions is formed of material having essentially the same coercivity.

It will be understood that the invention is not limited to spaced apart rectangularly shaped regions of magnetic material. Neither the actual shape of the regions of magnetic material, the number of magnetic regions nor the spacing are limitations of the present invention.

The object 150 can be verified utilizing a sensed plurality of randomly varying magnetic characteristics. Each randomly varying magnetic characteristic is associated with a particular magnetic region. In accordance with the present invention, each of the members of the plurality of magnetic regions 154 is initially saturated by a saturation strength magnetic field. Preferably, this magnetic field will be applied with a field strength five to six times that which is necessary to achieve saturation.

Figure 14:
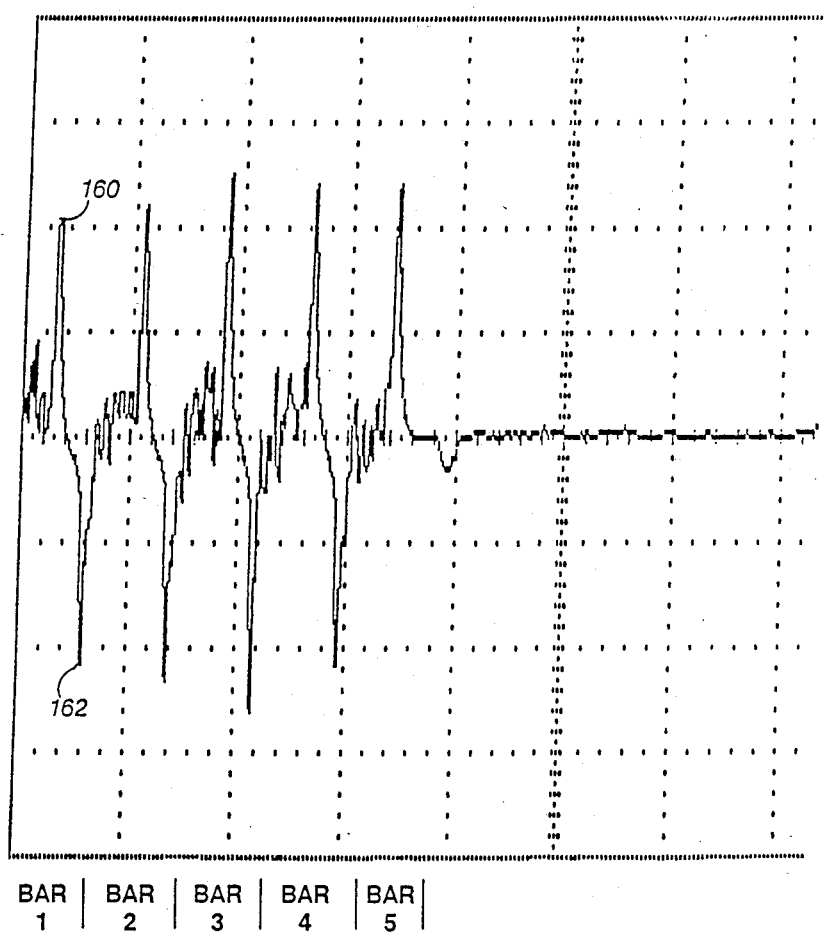
FIG. 14 is a plot of a randomly varying analog signal sensed off of the plurality of magnetic regions of the object of FIG. 13.

FIG. 14 illustrates a plurality of randomly varying magnetic characteristics displayed as a time varying electrical signal. The electrical signal of FIG. 14 was generated by passing an object, such as the object 150, adjacent a read head such that the plurality of magnetic regions 154 generated a voltage in the read head.

The plot of FIG. 14 illustrates an electrical output signal generated from five spaced apart rectangularly shaped magnetic regions. The magnetic regions or bars which were utilized to generate the electrical signal of FIG. 14 were printed on the underlying substrate using magnetic ink. FIG. 14 illustrates a first peak voltage 160 which was generated with a first polarity as a first edge of the first rectangularly shaped magnetic region passed a conventional read head. As the magnetic region continued to pass the read head and the second edge of the rectangularly shaped magnetic region passed the read head, a peak voltage 162 of the opposite polarity was generated. As the document carrying the five magnetic bars continued past the read head, the remaining electrical signals were generated as illustrated in FIG. 14.

As can be seen from FIG. 4, the peak values associated with each of the five magnetic regions or bars all vary from one another in a non-uniform fashion. It should also be noted that the purpose of subjecting the spaced apart magnetic region is to a saturation magnetic field such as generated by a magnet or by an energized electrical part is to produce a maximum detectable randomly varying characteristic of the type illustrated in FIG. 14. In addition, the generated signal is proportional to the amount of magnetic material in each rectangular region.

Figure 13B:
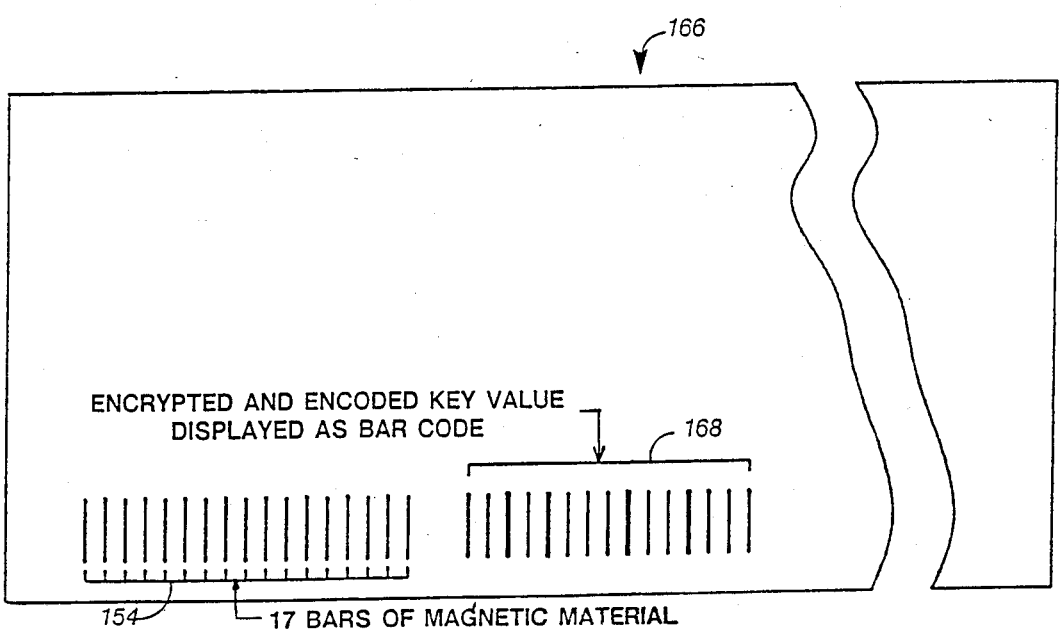

FIG. 13A also discloses a digital representation of the processed randomly varying characteristics stored on the object 150, as clocked binary data, between members of the plurality of spaced apart regions 154. FIG. 13B illustrates an object 166 with the encoded representation of the randomly varying characteristics stored on the object in bar code format.

Figure 15:
FIG. 15 is a family of plots of the sensed random magnetic characteristics of the same set of spaced apart regions moving past a read head three different times.

FIG. 15 illustrates the repeatability of the measurement process. Each of the graphs of FIG. 15 was generated by passing the same five bar carrying document past the read head. As is apparent from the plots of FIG. 15, which are time varying electrical signals of the type described with respect to FIG. 14, there is a substantial similarity between various passes of the same document pass the read head.

Figure 16:
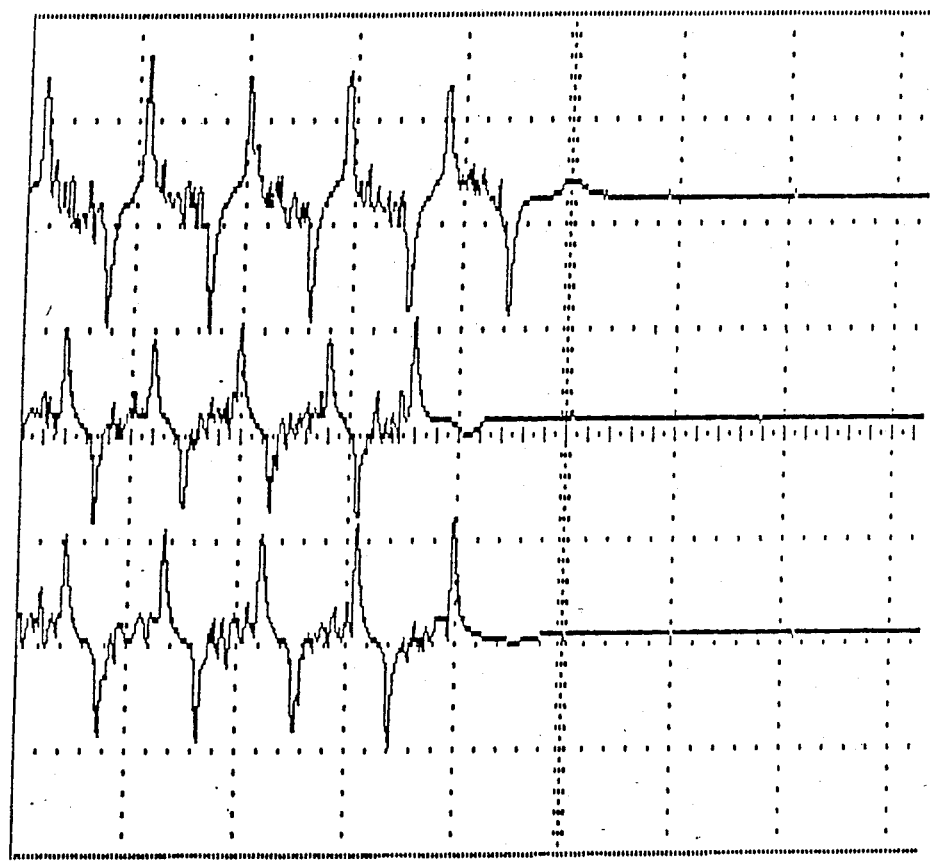
FIG. 16 is a family of plots of the sensed random magnetic characteristics of three different sets of spaced apart regions moving past a read head.

In contradistinction, the plots of FIG. 16 illustrate the electrical signals generated as three different five bar carrying documents were moved past a read head. As can be seem from FIG. 16, the output electrical signals in each instance are different.

The document 150 can be verified by comparing a profile generated off of the rectangularly shaped spaced apart magnetic members 154 to a previously generated and encrypted profile carried by the document 150. For exemplary purposes only, the previously generated and cryptic profile is illustrated in FIG. 13A carried on the document 150 as the series of clocked binary data bits 156 which are optically readable.

The members of the plurality of data 156 are clocked by the plurality of 17 bars of magnetic material 154. The presence of an optically detectable binary one as represented by member element 158 can be determined since it is positioned between two members of the plurality of magnetic regions 154. Absence of a member between two spaced apart regions of magnetic material corresponds to a binary zero.

As an alternate to the verifiable document 150 of 13A, FIG. 13B illustrates another verifiable document 166. The document 166 carries a plurality of spaced apart rectangularly shaped magnetic regions, corresponding to the regions 154. However, the previously encoded profile or key 168 is carried on the object 166 in bar code format. Hence, it will be understood that the representation of the previously measured and encoded profile is not a limitation of the present invention. That profile could be carried on the object in magnetic or optical form. Alternately, that profile could be recorded at a remote location for later comparison.

In contradistinction to the system and method previously discussed, the documents 150 and 166 with the spaced apart magnetic regions 154 are verifiable as a result of detecting randomly varying characteristics from two or more spaced apart magnetic regions. In addition, since the constant magnetic field which is applied to the spaced apart magnetic members is of an intensity great enough to saturate each of those members, no additional enhancing signal need be recorded on the plurality of spaced apart magnetic regions.

Figure 17:
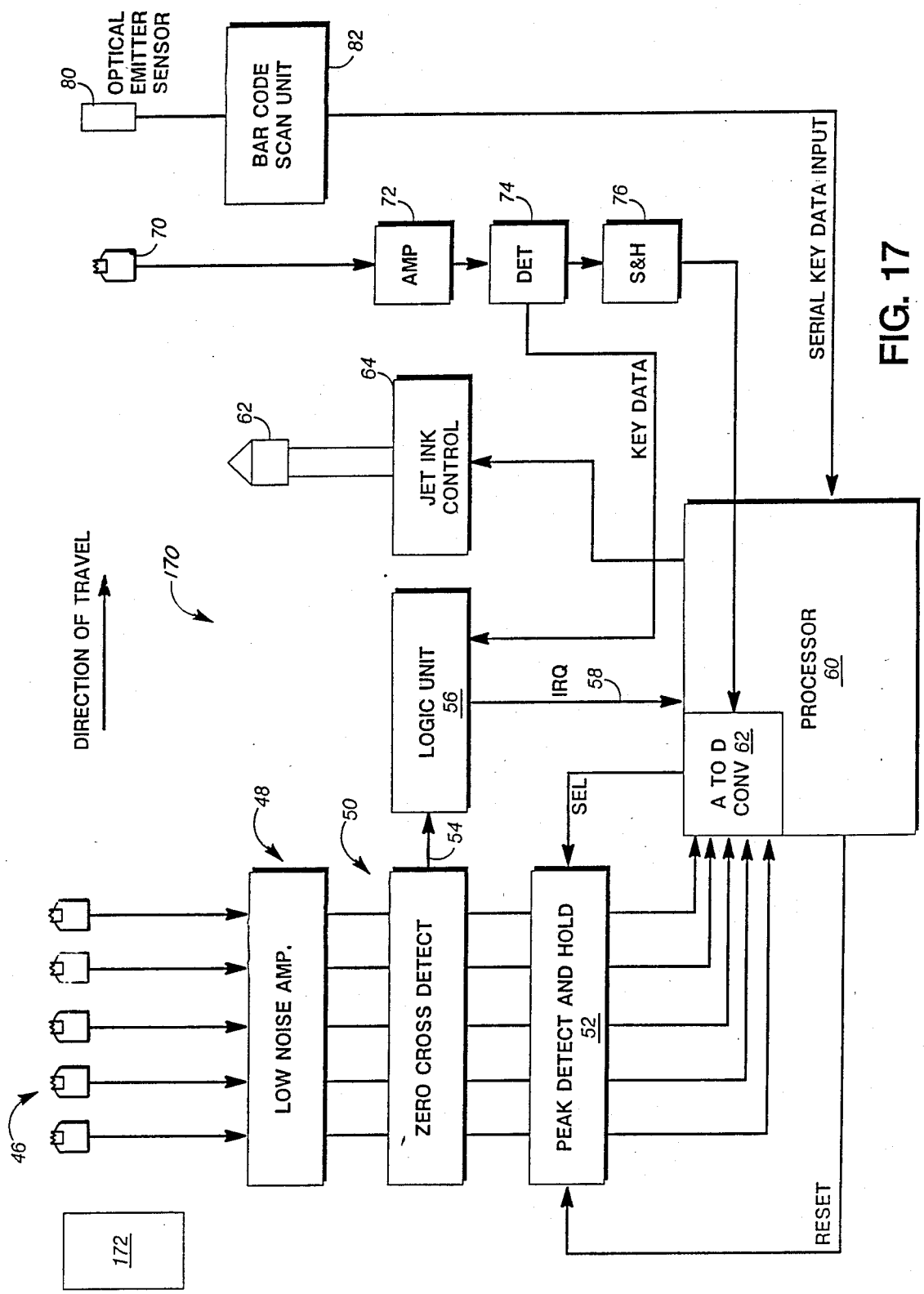
FIG. 17 is a block diagram schematic of a profile sensing and encoding apparatus usable with spaced apart magnetic regions.

FIG. 17 illustrates an apparatus 170 usable for the creation of verifiable objects. The apparatus 170 is very similar to the apparatus 40 of FIG. 6. Corresponding elements carry the same identification numerals.

The apparatus 170 of FIGS. 17 does not include a write head 42 and a pulse encoder 44 as in the apparatus 40. Instead, the object creation apparatus 140 includes a source 172 of a unidirectional, constant intensity magnetic field. The source 172 can be a permanent magnet or can be an energizeable electrical coil. The magnetic field generated by the source 172 needs to be of great enough intensity so as to reliably saturate the members of the spaced apart magnetic regions as those regions move through the apparatus 170. A field intensity on the order of 5 or 6 times that needed for saturation is preferred. The remaining elements of the apparatus 170 function the same way as they function in the apparatus 40. However, the method steps which are executed by the processor 60 are different in the apparatus 170 from those of the apparatus 40.

Figure 18A:
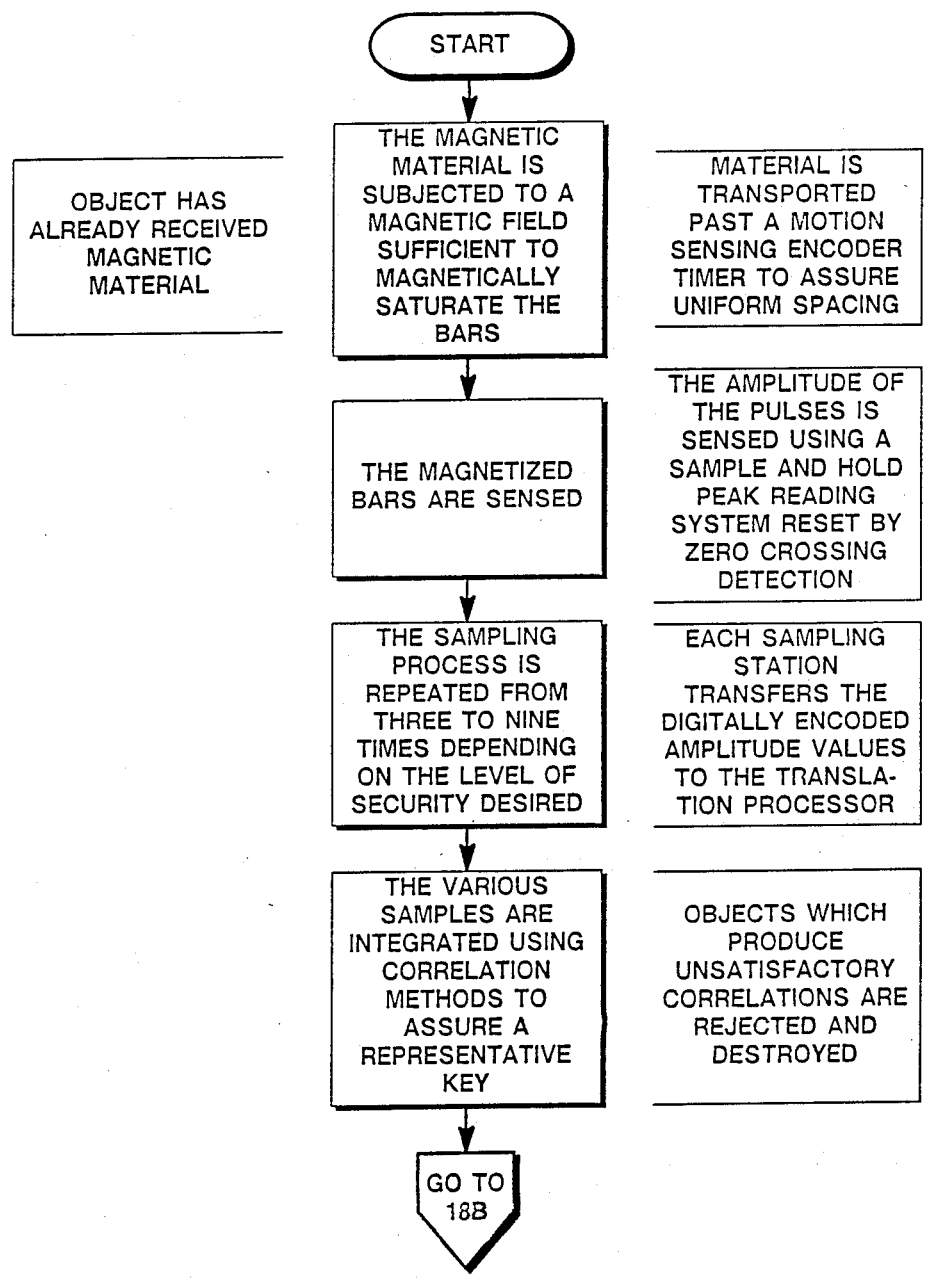
FIGS. 18A and 18B are a flow chart of the steps of a method of sensing and encoding a profile based on a plurality of spaced apart regions.
Figure 18B:
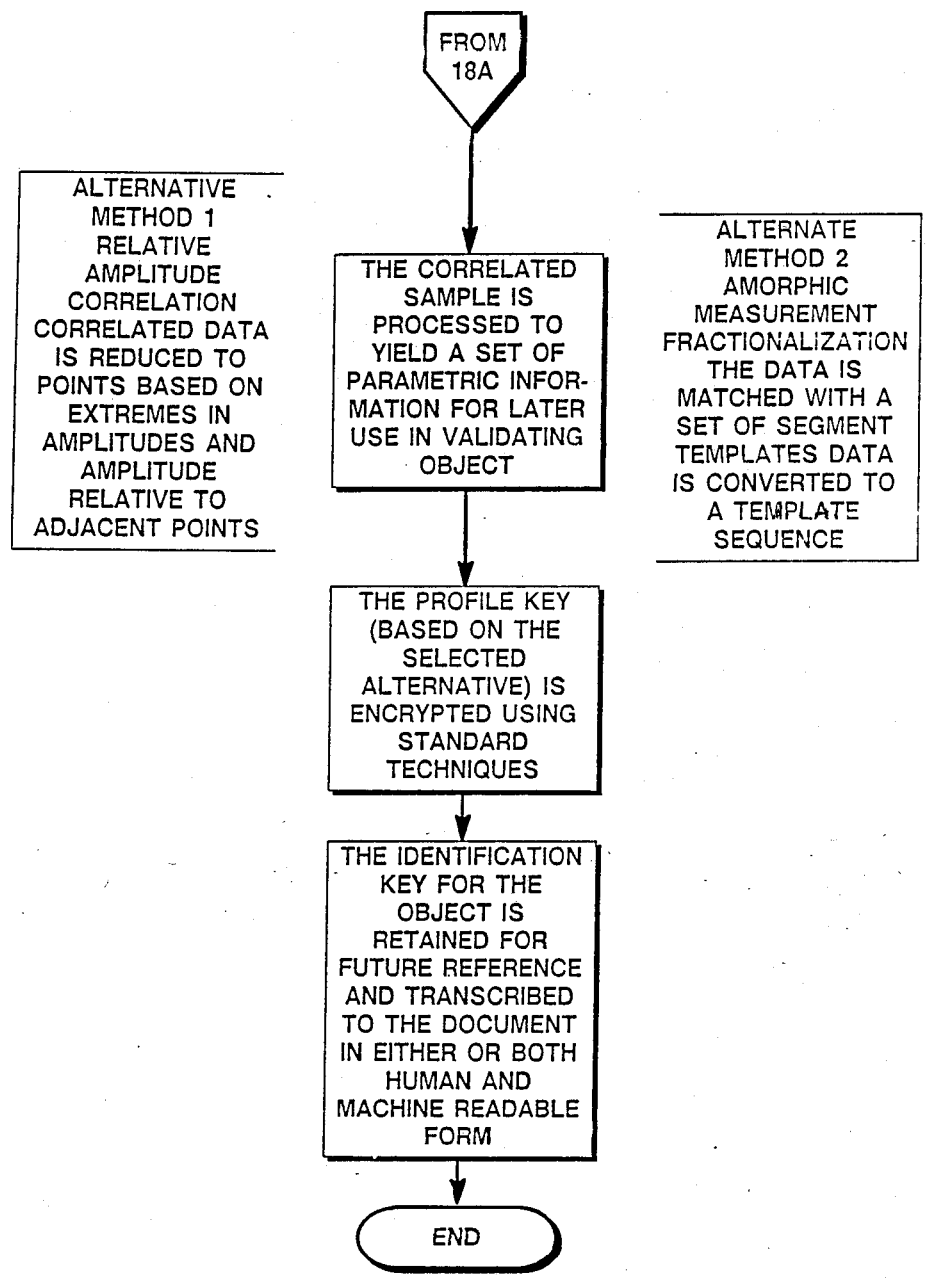

FIGS. 18A and 18B illustrate a method of creating a verifiable object as carried out by the apparatus 170. With respect to FIG. 18A, the spaced apart magnetic regions are subjected to the magnetic field which is sufficient to saturate each of them, such as by means of the source 172. The spaced apart magnetized bars are then sensed, such as by the read coils 46. The peak amplitudes of the sequential stream of pulses, between zero crossings are sensed and stored using peak detection hold circuitry such as the circuitry 52 at each zero crossing. The sampling process is repeated a plurality of times so as to obtain three to nine sets of peak values. The various sets of peak values can then be analyzed and correlated so as to create a representative profile or key. Those objects which produce unsatisfactory or inadequate correlations can be rejected and destroyed immediately.

With respect to FIG. 18B, the correlated representative set of peak values, which it should be noted, has been obtained from at least two different spaced apart magnetic regions, is processed to provide an encoded representation suitable for storage or later comparison. If desired, the encoded profile can then be encrypted to enhance security. The encrypted profile or key can neither be retained for future reference or transferred to the document in human or machine readable form or both.

Figure 19:
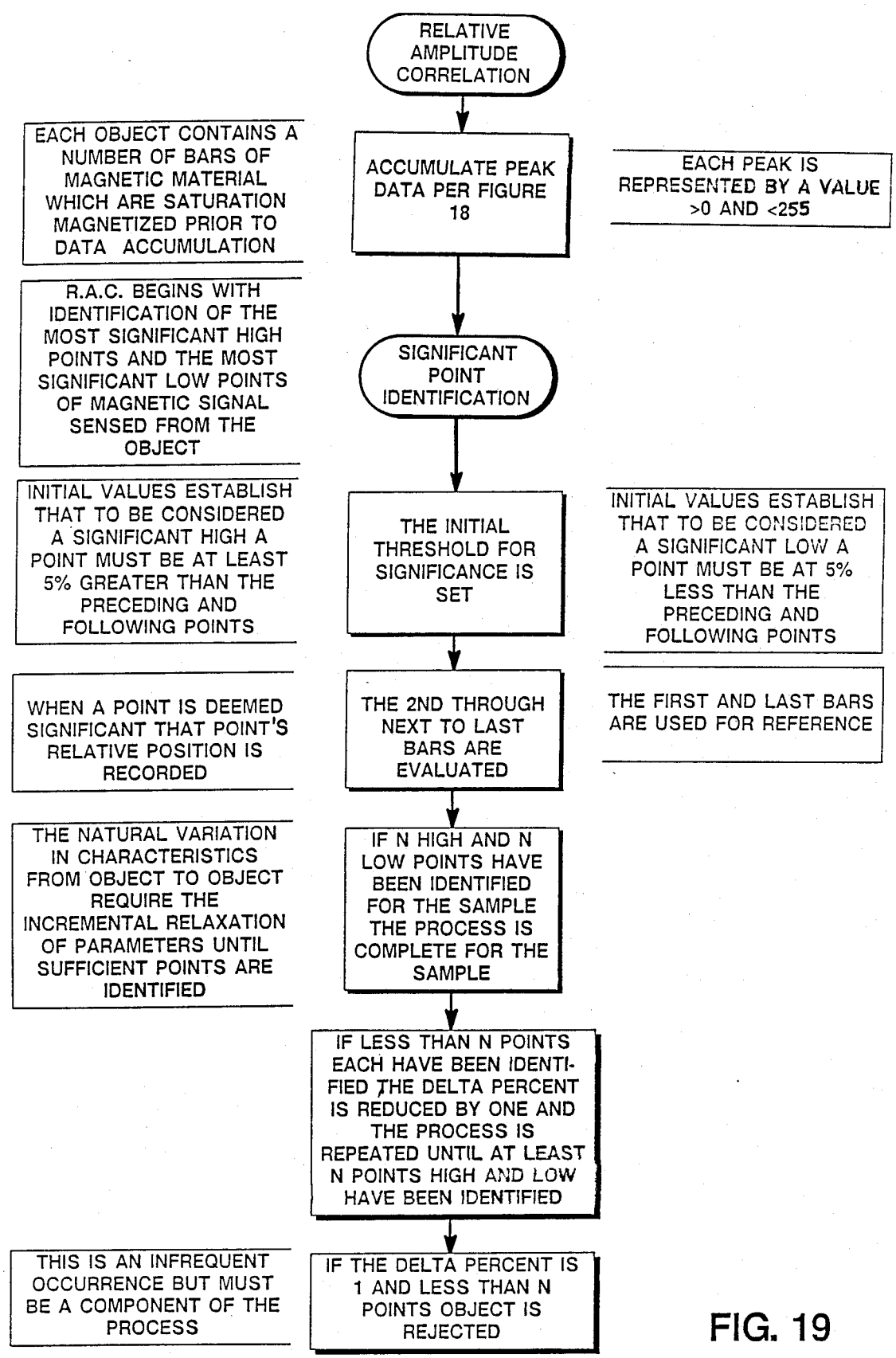
FIG. 19 is a flow chart of the steps of a method of forming a representative profile.

FIG. 19 is a flow chart illustrating the correlation step of FIG. 18A. Once the peak amplitude data has been accumulated as described above and disclosed in FIG. 18, an identification of the most significant high points and the most significant low points of the sensed magnetic signals is carried out. An initial threshold is set such that a significant high is a point which is at least 5% greater than the preceding and following points. Similarly, an initial threshold is set such that a significant low is a point which is at least 5% less than the preceding and following points. Relative position of significant high point and significant low points are recorded. A predetermined number of high and low points must be identified for each sample to complete the processing for that sample. If less than the predetermined number of points has been identified, the percentage is reduced by 1% and process is repeated until at least the specified number of high and low points have been identified.

Once the significant number of high and low points has been identified for each sample, the identified points are compared between samples. A significant high point or significant low point must occur in at least a predetermined number of samples, such as three, to be retained in the set of points used to form the representative profile. In the event that a significant high or significant low does not occur within the required number of samples, that point is discarded.

Figure 20:
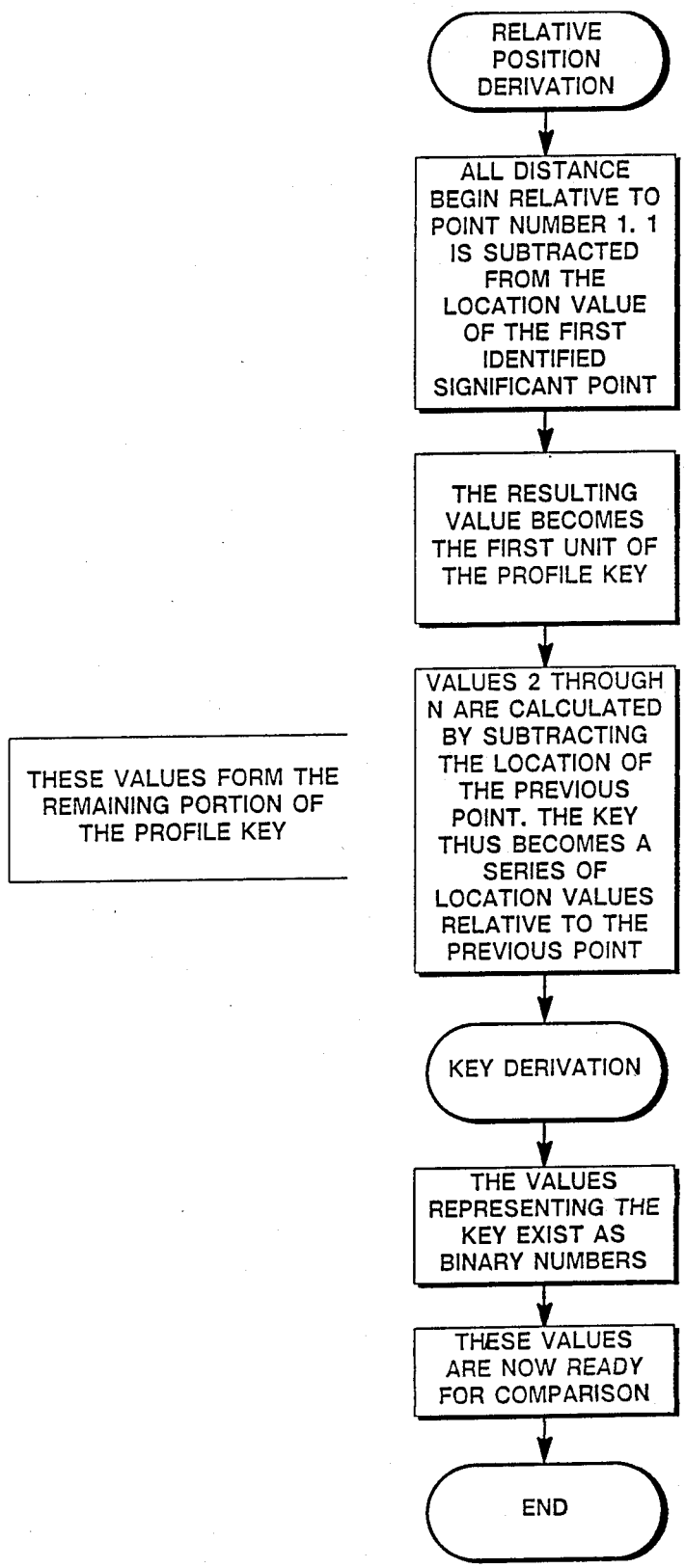
FIG. 20 is a flow chart of the steps of a method encoding a profile for later use.

FIG. 20 is a flow diagram illustrating the method of operation of the apparatus 170 in carrying out encoding Method 1. The relative positions of significant highs and lows are encoded to form a representative profile. All distances are measured relative to the initial sensed point. Hence, a value of 1 is substracted from the location value of the first identified significant point. The resultant relative value becomes the first unit of the profile key. Remaining values 2-n for the remaining significant points of the profile are calculated by substracting the location of the immediately previous significant point. The key thus becomes a series of displacement values each of which is relative to the previous point. The elements of the key thus represent relative displacement values of significant correlated high and low points from among various spaced apart magnetic regions. The values can then be recorded on the object or in a central storage area.

To verify an object such as the object 152, an apparatus such as the apparatus 100 previously described in FIG. 10 can be used. A magnetic field source such as the source 172 shown in phantom in FIG. 10, can be added to the apparatus 100. This magnetic field source will resaturate the spaced apart magnetic regions prior to the read head 102 detecting them. By resaturating those regions prior to detecting them, the magnetized condition of the regions can be restored to what it initially was. Hence, if the object had been exposed to intervening magnetic fields, they would have no effect on the verification process.

Figure 21A:
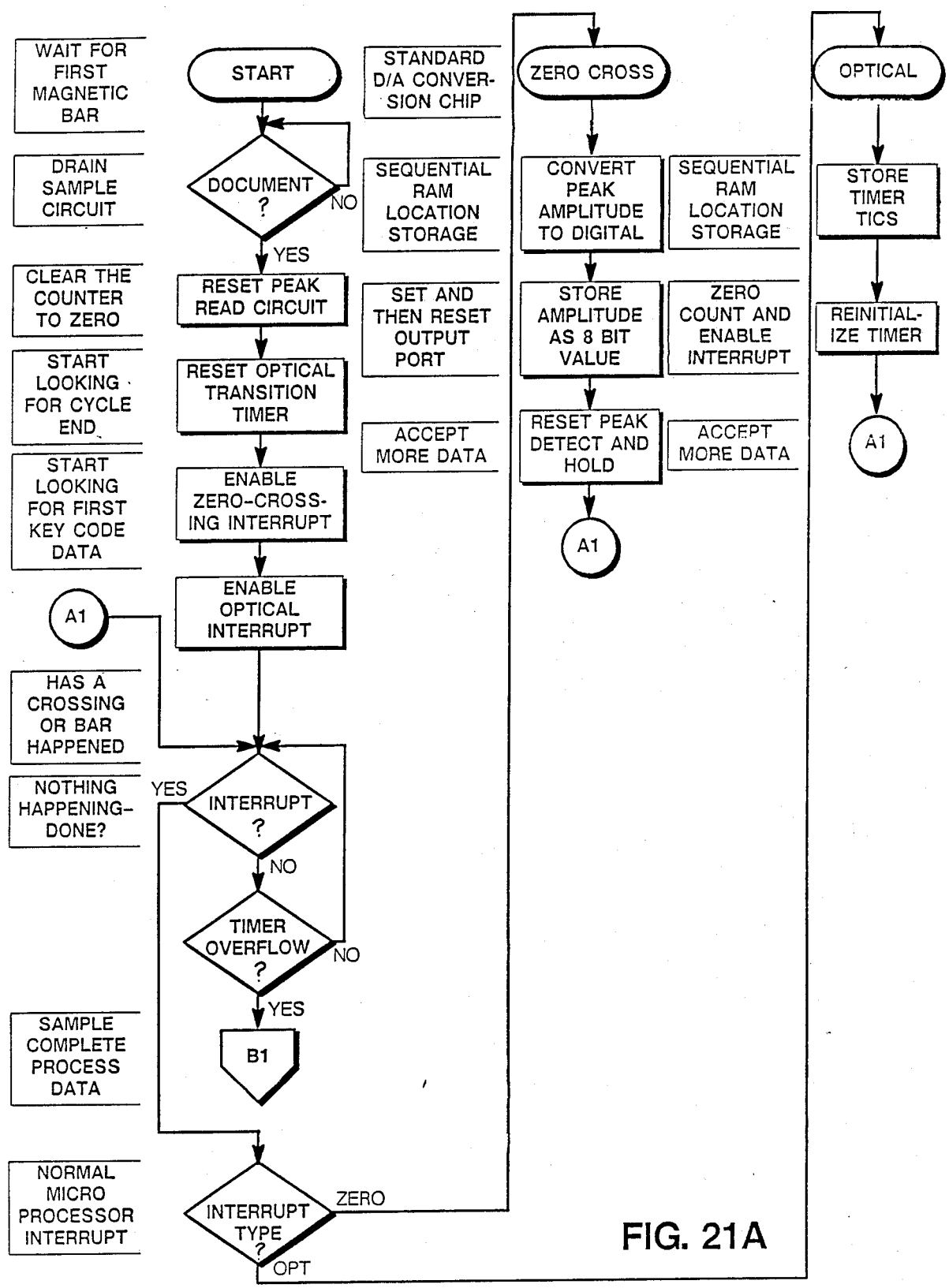
FIGS. 21A and 21B are a flow chart of the steps of a method of validity an object carrying a plurality of spaced apart magnetic regions.
Figure 21B:
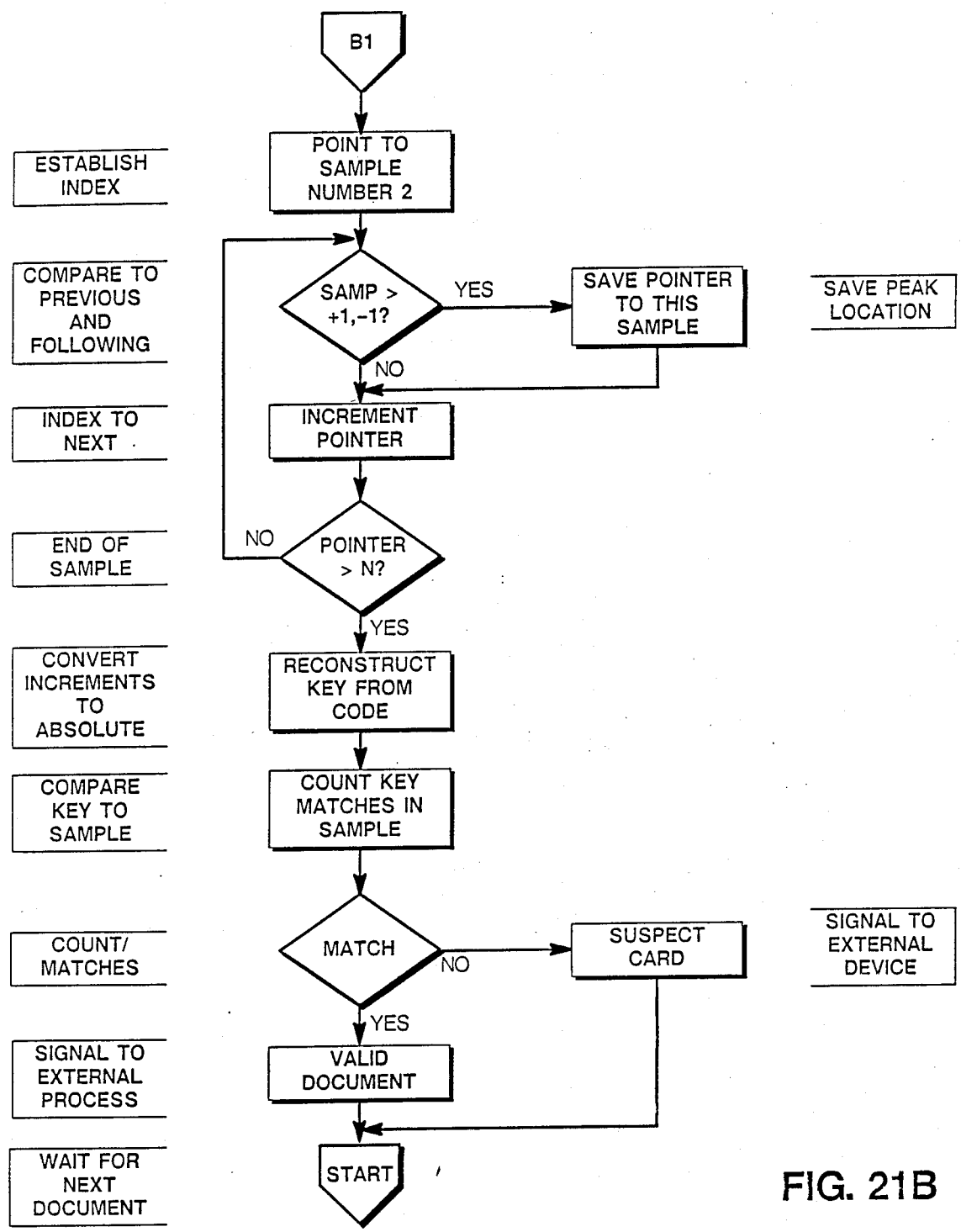

The flow charts of FIGS. 21A and 21B illustrate the steps of the verification method carried out by the processor 112. The flow charts of FIG. 21A and 21B are structurally identical to the flow charts of FIGS. 11A and 11B previously described. Hence, the description of FIGS. 11A and 11B can be referred to. Minor differences arise between various parameter values in FIGS. 11A and 11B as opposed to FIGS. 21A and 21B due to the fact that in the latter case, a plurality of spaced apart bars having fewer members is being sensed to create a profile for comparison to the previously stored representative profile. These minor differences do not change the operation of the flow charts of FIGS. 21A and B described earlier with respect to FIGS. 11A and B.

Figure 22A:
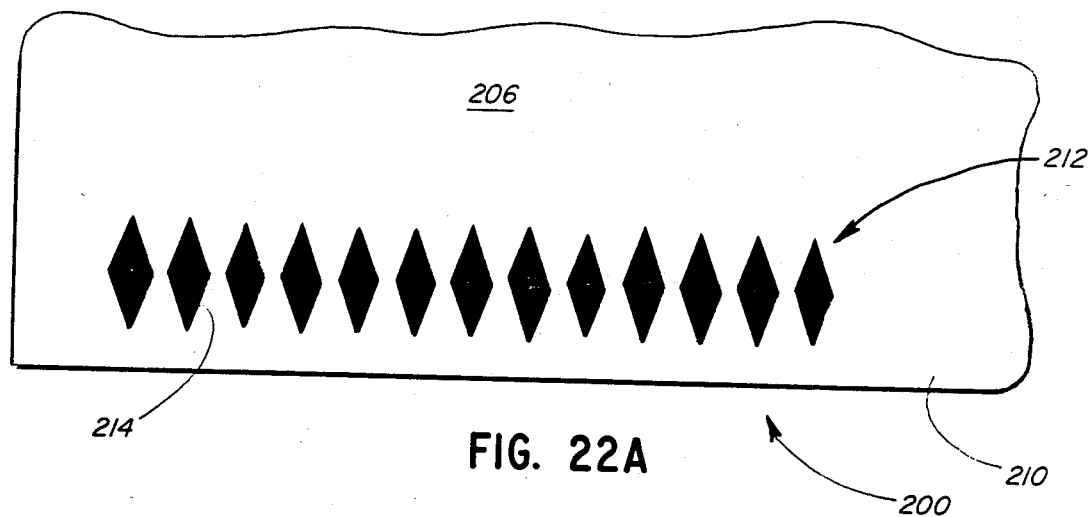
FIGS. 22A illustrates a portion of a verifiable object 200.

FIG. 22A illustrates a portion of a verifiable object 200. The object 200 is represented in FIG. 22A in the form of a planar document. It will be understood, however, that the security system utilized in connection therewith is not limited to such documents but can be used in fact with a wide variety of objects.

The object 200 has a substrate 206. The substrate 206 can be opaque or can be transmissive of radiant electromagnetic energy such as emitted by an incandescent or fluorescent source. It will be understood that the nature or type of the substrate is not a limitation of the present invention. Further, as described subsequently, the present exemplary embodiment is a magnetically based system wherein the quantity and nature of the magnetic material deposited on the substrate is essentially independent of the characteristics of the underlying substrate. The material deposited is primarily a function of the deposition process.

Figure 22B:
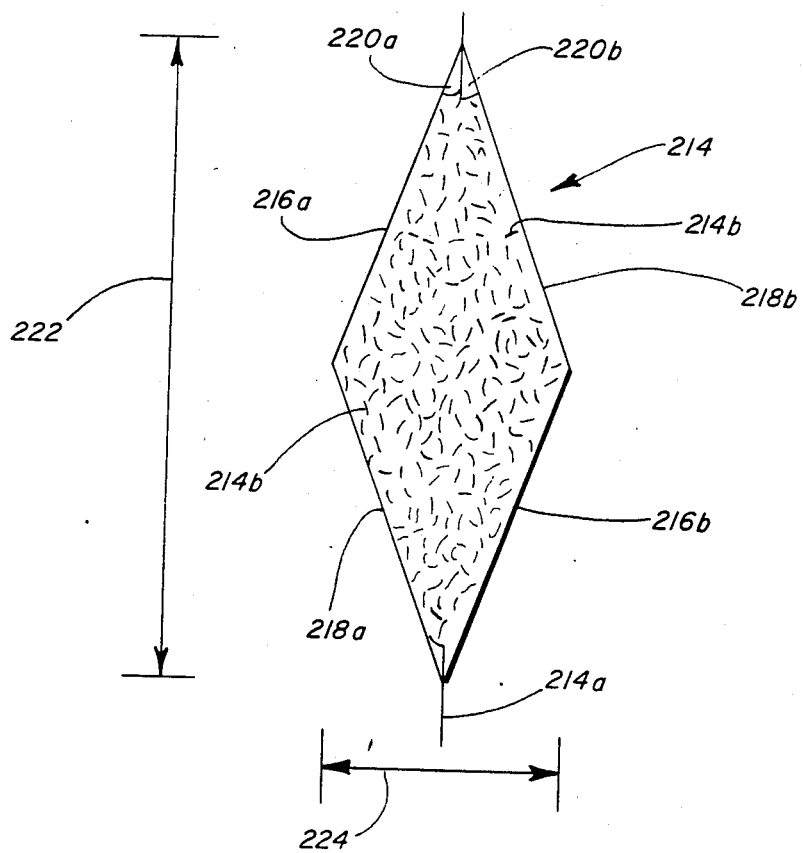

Positioned on a region 210 of the substrate 206 is a plurality of magnetic security elements 212. Each member, such as the member 214 of the plurality 212, best seen in FIG. 22B, is formed with a generally diamond shape. The member 214 has first and second spaced apart sides or edges 216a and 216b which are generally parallel to one another The sides 216a and 216b are intersected by two spaced apart sides 218a and 218b, also generally parallel to one another.

With respect to a center line 214a, the edge 216a is oriented at an angle 220a and the order of 20°. Similarly, the edge 218b is oriented at an angle 220b with respect to the center line 214a, also at an angle on the order of 20°. The magnetic security region 214 has an overall height dimension 222 on the order of 0.145 inches and an overall maximum width dimension 224 on the order of 0.060 inches.

Each of the members of the plurality 212 corresponds substantially to the shape and size of the diamond shaped element 214. The diamond shaped elements 212 can be deposited by means of an offset or flexographic printing press. For this purpose, standard magnetic ink character recognition (MICR) inks can be used. In the exemplary embodiment of FIG. 22A each of the diamond shaped members of the plurality 212 is intentionally deposited on the substrate 206 so as to be as similar as possible to every other such member.

Magnetic inks of the type used to print the members of the plurality 212 and slurries used to form the region 16 are composed of small magnetic particles. These particles vary in dimension, mass and composition. The composition of the particles is such that they may be easily magnetized. FIG. 22B illustrates a plurality of variously oriented magnetizable particles 214b within the diamond shaped member 214.

The ink is made by blending a quantity of particles with various liquids. This mixture is developed to provide the desired combination of concentration viscosity, adhesion and drying.

The ink is then applied to paper and/or other substrates utilizing a variety of printing or extrusion methods. When so applied, the magnetizable particles are randomly distributed as illustrated in FIGS. 22B and 23A.

If the end product is intended for use in analog (sound) or digital (data) recording, the magnetic material 230, in a semifluid state, is passed close to a high strength nonvarying magnetic field, such as generated by a magnet 232 after application to the substrate. The field generated by the magnetic 232 causes the otherwise randomly oriented particles to move toward uniform alignment as illustrated in FIG. 23C. A magnetic region 234 which has been subjected to an unidirectional field will have two components. A component formed of aligned elements 236 and a component formed of unaligned elements 238.

A magnetic security region, such as each of the members of the plurality 212 need not be subject to a unidirectional field during manufacture. The random distribution of those particles, as in FIG. 22B has been noted above. Even if a magnetic security region is subject to such an alignment field during manufacture, perhaps because it is part of a larger magnetic region, as illustrated in FIG. 23C the region will still include a substantial percentage of unaligned material.

The manufacturing processes used for medium quality magnetic media fail to align more than 75% of the material. The hiss of audio recording tape is one of the many effects of these nonaligned particles.

Uniform alignment is preferred with recordable magnetic regions so as to maximize the electrical signal generated from a recorded region as that region moves adjacent a read head, or coil, having a predetermined orientation.

When magnetic recording media is manufactured, the strength of a signal recorded on material oriented with the axis of alignment is compared to a signal recorded on material oriented at 90° to that axis. This squareness ratio is 70% for medium quality media and 85-90% for the highest quality media.

When magnetic material is applied using conventional printing techniques the individual particles are essentially randomly oriented as in FIG. 22B. Small variations in the ink, the application method, and the equipment result in some regions having more particles aligned in a given direction than in another.

The ink related variations include the nature and composition of the ink. The press related variations include speed, working pressures, viscosity, temperature and type of printing plates. The thickness of the deposited material also varies.

As is well known, the heads used for reading or sensing a recorded magnetic region contain a gap. It is preferred to align the gap so as to be parallel to those particles from which the greatest contribution to the signal output from the read coil is desired.

If magnetic regions are constructed in a way which permits readings of the strength of particles aligned in two different axis then it is possible to detect a ratio of randomness therebetween.

In accordance with the invention, this method is implemented by printing the plurality of diamonds 212 utilizing MICR ink as illustrated in FIG. 22A. Each such diamond presents the ability to position read heads oriented at an angle with respect to one another so as to sense each of the essentially equal faces or edges of each diamond.

A sensor or read head with two gaps oriented such that one gap is parallel to each leading diamond edge, permits comparison of the particulate orientation. FIG. 24 illustrates a sensor 250 usable with the magnetic security elements 212.

The sensor 250 has a housing 252 with a surface 254. The surface 254 includes a first slit 256a with a first orientation and a second slit 256b with a second orientation. The slits 256a and 256b are oriented so as to have an angle substantially equal to 20° with respect to a reference line 258c. The angles 258a and 258b correspond to the angles 220a and 220b and are on the order of 20°.

Figure 25A:
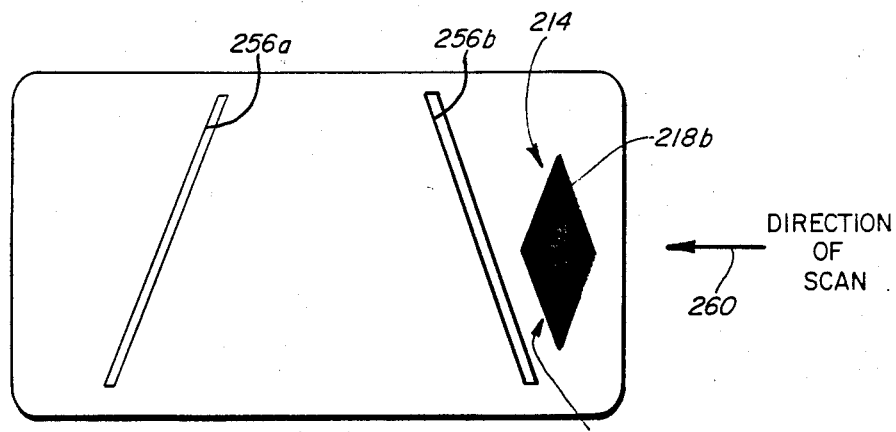
FIGS. 25A and 25B illustrate the relationships between the magnetic security regions 212, and the sensor 250.
Figure 25B:
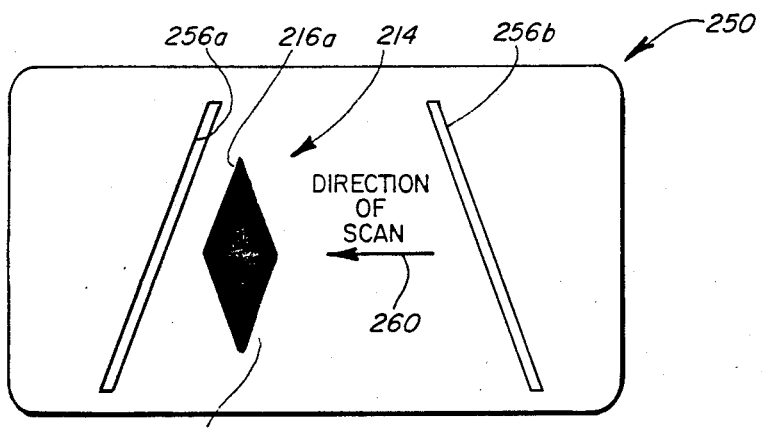

FIGS. 25A and 25B illustrate the relationships between the magnetic security regions 212, as illustrated by the element 214, and the sensor 250.

The sensor 250 could include a pair of magnetic read heads of a conventional variety. One read head would be positioned adjacent each of the slots 256a and 256b. Alternately, sensor 250 could include a single read head extending between the slots 256a and 256b.

If the element 214 is moved relative to the sensor 250 in a direction 260, the edge 218a will cross the slot 256b, best seen in FIG. 25A. A voltage will be induced in the sensor 250 due to a change of flux. Because the slot 256b has the same orientation as does the edge 218a, the portion of the magnetic particles which are aligned therewith will be substantial contributors to the induced voltage generated by the sensor 250. Magnetic particles in the region 214 which are aligned other than parallel to the edge 218a as is well known, will contribute a substantially smaller portion of the signal from the sensor 250.

When the member 214 moves across the slot 256b relatively small voltages will be induced in the sensor 250. As the edge 218b passes across the slot 256b a large voltage will be induced, of the opposite polarity to the previously noted voltage. The magnitude of this voltage will also be proportional to the alignment of sensed particles aligned with the slot 256b.

As the element 214, FIG. 25B, approaches the second slot 256a a voltage will be induced in the sensor 250 when the edge 216a crosses the slot 256a for the reasons set forth above. Similarly, when the member 214 moves away from the slot 256a a voltage of the opposite plurality will be induced when the edge 216b crosses over the slot 256a.

As noted previously, the voltages induced as the edges 216a and 216b as well as the edges 218a and 218b cross over the respective slots 256a and 256b will be proportional to the portion of detected particles aligned with the respective slots.

Figure 26:
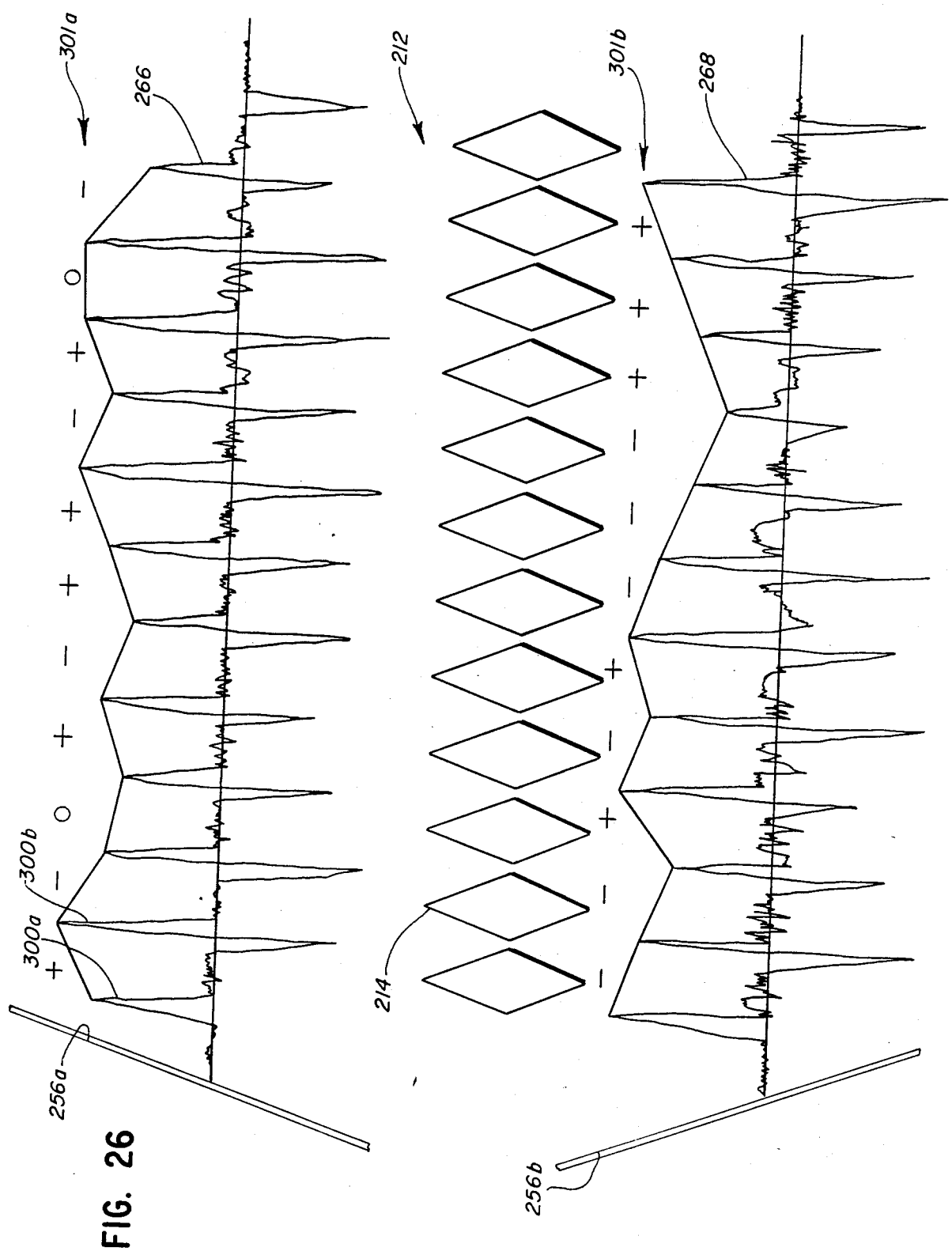
FIG. 26 illustrates first and second voltages 266 and 268 generated by the sensor 250.

FIG. 26 illustrates first and second voltages 266 and 268 generated by the sensor 250 as the plurality of magnetic diamonds 212 moves passed the first and second slits 256a and 256b having first and second orientations with respect to the reference line 258c. As can be seem from FIG. 26, there is a substantial variation in peak values of wave forms 266 and 268. These variations appear to be due to differences in the amount of magnetic material deposited at a given diamond shaped member as well as due to differences in the orientation of the magnetic material. These differences in orientation are detectable by means of the sensor 250.

The shape of the security regions 212 results in a 40° angle between the slots 256a and 256b. Other angles could also be used. For example, 45° between the slots 256a and 256b, while requiring a larger diamond, might maximize the detected signals as well as provide maximum interrelationship between the electrical signals generated by the sensor 250.

It is an important aspect of the present invention that an attempt to modify the magnetic region 214 to alter the electrical signal 266 will simultaneously alter the electrical signal 268. Hence, the security provided by the plurality 212 is substantial notwithstanding that the elements 212 could readily be detected on the substrate 212.

Figure 27:
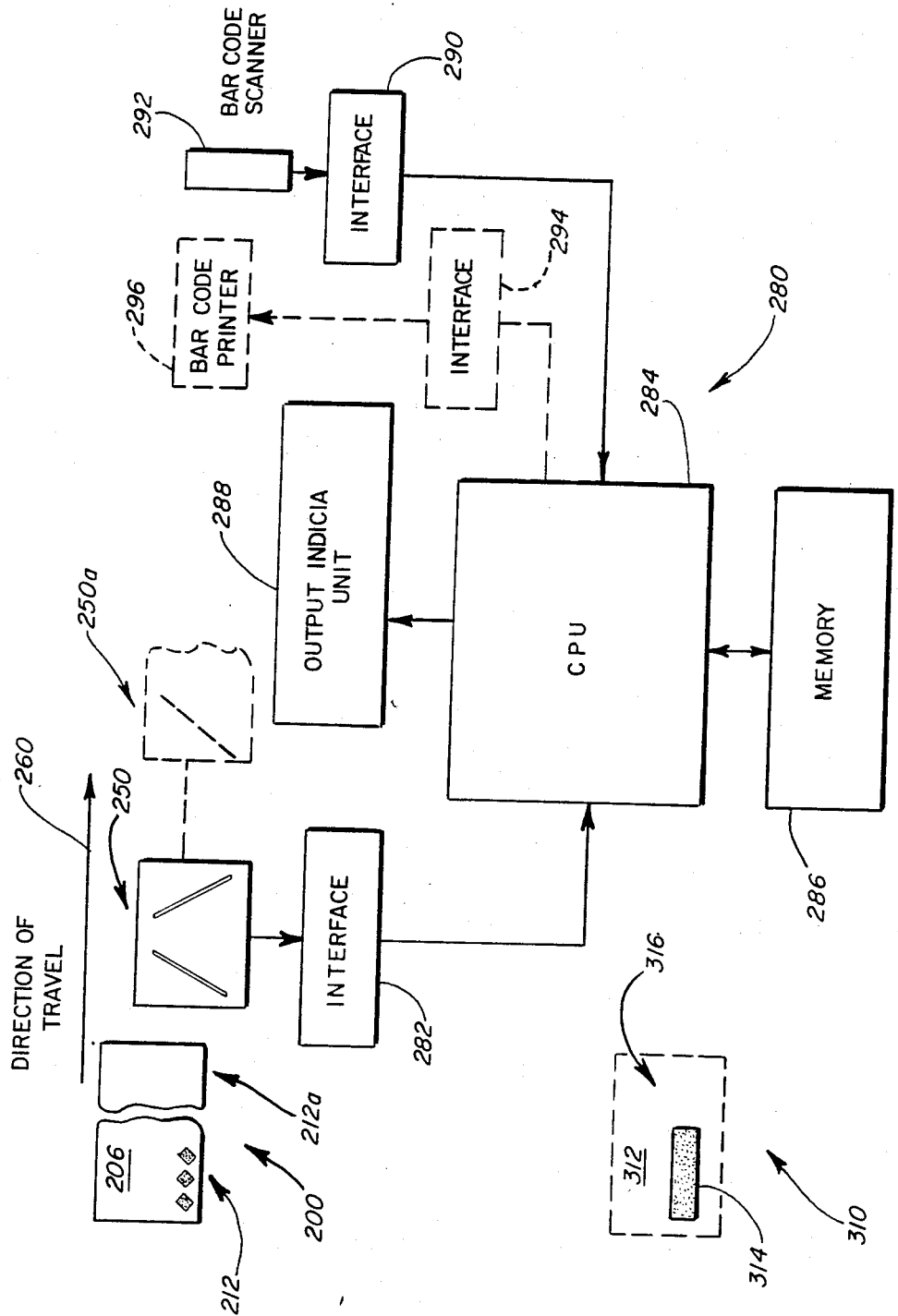
FIG. 27 is a schematic block diagram of an object verifier in accordance with the present invention.

FIG. 27 is a schematic block diagram of an object verifier, illustrated in solid lines, or a verifiable object producer indicated in both solid and dashed lines, in accordance with the present invention. The verifier form of the apparatus 280 can be used to verify the authenticity of the object 200. The apparatus 280 includes the previously discussed sensor 250. The sensor 250 is electrically coupled to an interface 282. The interface 282 is in turn electrically coupled to a programmed processor 284.

The programmed processor 284 can be implemented as any one of a variety of micro-computer chips commercially available. The processor 284 is in turn coupled to both random access and read only memory 286. The processor 284 can provide output signals to an output indicia unit 288.

The unit 288 could be one or more light emitting diodes or incandescent lights. Alternately, the unit 288 could be a printer or a video display.

In addition, the processor 284 receives electrical inputs from an interface 290. The interface 290 is in turn electrically coupled to a bar code scanner 292.

Verification of the object 200 includes passing the plurality of diamond shaped security members 212 adjacent a relatively high energy magnetic field. This magnetic field could be generated by a magnet (not shown) positioned adjacent the sensor 250. The purpose of the field is to magnetize all of the particles in the magnetic regions 212 such that the sensor 250 will generate the maximum possible electrical signals for use by the processor 284.

It will be understood that the use of the previously noted magnetic field provides a maximum generatable electrical signal but is not a limitation of the present invention.

The object 200 is passed adjacent the sensor 250, as illustrated and discussed previously with respect to FIGS. 25A and 25B. During that process, electrical signals such as the electrical signals 266 and 268 are generated by the sensor 250 and coupled to the interface 282.

The interface 282, as described previously in connection with earlier system disclosed herein, can sample and digitize the electrical signals 266 and 268 so as to detect a sequence of peak values therefrom. The processor 284 can in turn store the detected values in random access memory 286. In addition, the object 200 can be moved adjacent the bar code scanner 292. The bar code scanner 292 can detect a representation 212a in bar codes format previously applied to the object 200. The representation 212a is a previously formed representation of the magnetic characteristics of the regions 212.

The processor 284 can then process the digitized sequence of peak values corresponding to the wave forms 266 and 268 as is discussed in more detail subsequently. The processed representation can then be compared to the prestored representation 212a.

Based on a similarity or a dissimilarity between the newly sensed electrical signals 266 and 268 and the previously sensed and recorded bar code 212a, the processor 284 can make a determination as to whether or not the object 200 is authentic or has been altered. The processor 284 can then generate a selected electrical signal or signals so as to drive the output indicia unit 288 which in turn provides an appropriate display of the correct condition.

The process of creating a verifiable object can be carried out using the verifiable object creation form of the apparatus 280 of FIG. 27. In this instance, the processor 284 stores a plurality of peak detected electrical signals generated by the sensor 250 as the plurality of diamond shaped security regions 212 moves adjacent thereby. As the object 200 continues in its direction of travel 260, the processor 284 processes the sensed electrical signals, corresponding to the electrical signals 266 and 268.

Using an interface 294 coupled thereto, the processor 284 can provide a plurality of signals to a bar code printer 296. The bar code printer 296 imprints the object 200 with bar code, corresponding to the bar code 212a. The bar code 212a then becomes a permanent representation, carried on the substrate 206, of the magnetic characteristic of the security regions 212. If desired, additional sensors 250a can be used to carry out additional sensings in parallel.

The peak reading for each region for each electrical signal 266 and 268, as noted above, is retained for processing. The relationship between each region, represented by a peak value of pulse 300a (See FIG. 26), and the subsequent region, represented by a peak value of a pulse 300b is expressed as an increase in magnitude (+), decrease in magnitude (−) or no change (0). A plurality of peak relative indicia 301a can be generated with respect to the electrical signal 266. This process is repeated for each slot orientation 256a and 256b. A second plurality of peak relative indicia 301b can be generated with respect to the electrical signal 268. This method eliminates the need for calibration of heads or electronics to standards or to each other.

Relative amplitude correlation techniques are used to establish the slope relationships between readings of the same head. Each reading is evaluated relative to the previous region not against any predetermined value or standard. The results are expressed only in terms of direction not value. Table I illustrates first and second pluralities of peak relative indicia 301a, 301b from the waveforms 266 and 268.

If only one reading were taken of each region, such as the region 214, it would be possible to recreate the security information simply by increasing or decreasing the quantity of magnetic material. When two readings are taken accordance with the present invention security is substantially increased.

Three possible conditions exist when the two readings are compared:
1. One or both readings indicate 0 slope
2. Both slopes are the same sign
3. Slopes have opposite signs.

Zero slopes from either reading result in the region being ignored for security purposes. This occurs for about 20% of the regions.

Both slopes having the same sign is a condition of minor value for security and occurs in 35% of the regions. These readings are more the result of gross variations in the printing process rather than particle orientation.

Slopes of opposite signs result when the particle alignment favors one head orientation more than the other. This occurs in about 45% of the regions. These regions are of the greatest value for security purposes. Attempting to alter one reading by modifying the respective magnetic region will result in the other reading also being altered.

A composite sequence, as illustrated in Table I can then be recorded, using the bar code printer 29G, in the representation 212a on the document 200 for later use in verification. It will be understood that the composite sequence from Table I could be encoded or encrypted using a variety of known techniques. The selected technique is not a limitation of the present invention.

In accordance with the invention a three-bit encoding scheme can be used to represent the composite sequence of Table I. As illustrated in Table II, an ambiguous indication can be represented by a code of 00 with an unspecified sign. An indication of the same direction of relative movement, same sign, can be represented by a positive or negative sign along with the code 01. The sign indicates the direction of movement for the two signals.

In the event that a different direction of movement between the two signals is detected, a positive or negative sign in conjunction with a code of 10 can be used. The positive or negative sign indicates the direction of relative movement with respect to an arbitrary one of the slots.

The bottom line of Table I is an encoded representation of the composite sequence of incremental direction changes of the third line of Table I.

During the object verification process, a greater weight can be given to the encoded elements representing different directions of incremental movement of the signals. Since an incremental indication of opposite movement of the two signals indicates a shift in the ratio of orientation of the magnetic particles for a given region assignment of a greater value to those data points emphasizes the importance of such regions.

For example, composite data points indicating different or opposite directions of incremental signals could be assigned a value of four. Data points corresponding to movements in the same direction could be assigned a data point value of 1. Ambiguous points could be assigned a point value of zero.

A sum of values associated with the most recently sensed representation of the security regions can be compared with a corresponding sum from the bar code prerecorded on the object. If the two sums agree within a predetermined range the object can be accepted as authentic. In contradistinction, if the summed weighted data points of the present and prior readings do not agree within the predetermined range the object can be rejected as not authentic.

While the present invention has been described in terms of a documentary type object carrying only the plurality of spaced apart security members 212 and the corresponding bar code representation of the characteristic thereof 212a, it will be understood that verifiable objects could also include other types of indicia. These could include photographs, alphanumeric characters whether in encrypted or unencrypted form as well any other desired indicia. The other potential indicia carriable by the substrates 206 do not represent a limitation of the present invention.

With respect to FIG. 27, an alternate object 310 in accordance with the present invention includes a substrate 312. The substrate 312 carries a generally rectangularly shaped elongated magnetic region 314. Region 314 can be applied to the substrate 312 using a variety of methods as discussed previously herein. The exact method of deposit of the region 312 is not a limitation of the present invention. The object 310 also includes a coded representation in bar code format 316.

Figure 28:
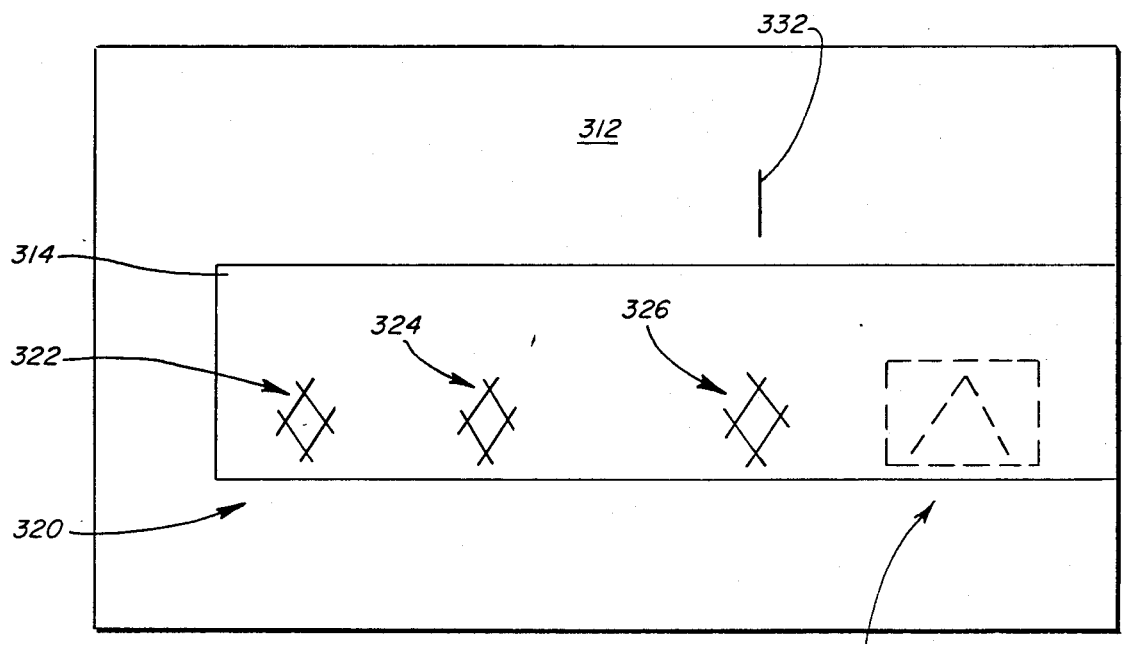
FIG. 28 illustrates a portion of the continuously extending magnetic region of 312 utilized to for a plurality of spaced apart magnetic security regions.

A portion of the continuously extending magnetic region of 312 can be utilized to form a plurality of spaced apart magnetic security regions 320 best shown in FIG. 28.

Each of the magnetic security regions 320, such as the regions 322, 324 and 326 is formed on the continuously extending, recordable magnetic region 314 spaced apart from adjacent security regions. Each of the regions 322, 324, 326 has a generally diamond like shape and is defined on the region 314 by scoring or marking that region selectively during the manufacturing process. It will be understood that the remainder of the magnetic region 314 can be used in a standard and known fashion for the purpose of reading and writing digital or analog electrical signals thereon. Standard recording techniques can be used for this purpose. The form of recording other information on the continuously extending magnetic region 314 is not a limitation of the present invention.

While each of the magnetic security regions 322, 324 and 326 has been formed with a generally diamond like shape, it will be understood that the diamond like shape thereof is not a limitation of the present invention. In accordance with the invention, the selected security magnetic region, such as the region 322 is sensed with a sensor 330 from two different orientations. The sensor 330 corresponds to the sensor 250 previously discussed.

It will be understood that a magnetic security region in accordance with the present invention can be formed in a variety of shapes. While a diamond like shape of the type disclosed herein is preferred because of the nature and magnitude of the electrical signals which can be generated thereby, the invention is not limited to such shapes.

In addition to scoring the magnetic region 314, the security regions, such as 322, 324 and 326 can be defined thereon by scribing the stripe 314 with a laser beam. Alternately, the security regions could be located in the continuously extending recordable magnetic region 314 and located at a field delimiter or could be located adjacent an optical strobe signal 332 carried by the substrate 312. Again, it is to be understood that in accordance with the present invention, the alignment of magnetic particles at a defined security region is to be sensed from two directions. These directions are oriented at a selected angle with respect to one another independently of how the region itself is defined.

The object 310 could be used in conjunction with a verification or object creation apparatus 280 of the type discussed previously.

TABLE I

| PEAK RELATIVE INDICIA | | | | | | | | | | | | |
|---|---|---|---|---|---|---|---|---|---|---|---|---|
| 301a | + | − | 0 | + | − | + | + | − | + | 0 | − | HEAD 1 + 20° (Slot 256a) |
| 301b | − | − | + | − | + | − | − | − | + | + | + | HEAD 2 − 20° (Slot 256b) |
| | * | − | 0 | * | * | * | * | − | + | 0 | * | COMPOSITE |
| | +10 | −01 | ×00 | +10 | −10 | +10 | +10 | −01 | +01 | ×00 | −10 | ENCODED |

* OPPOSITE
+ BOTH +
− BOTH −
0 AMBIGUOUS

TABLE II

| ×00 | AMBIGUOUS |
| ±01 | SAME |
| ±10 | DIFFERENT |

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A method of verifying the authenticity of an object which has a plurality of spaced substantially identically shaped security regions of magnetic material thereon with the magnetic regions each having a measurable unique randomly variable characteristic and each including first and second non-parallel edges displaced from one another, the method comprising:

generating an electrical signal associated with respective ones of the first edges and indicative of the unique characteristic sensed from a first orientation of each of respective ones of the regions;

generating an electrical signal associated with respective of the second edges and indicative of the unique characteristic sensed from a second orientation of each of respective ones of the regions;

processing the electrical signals so as to form a representation of selected of the characteristics;

retrieving a prestored representation of a set of previously generated electrical signals associated with unique characteristics of at least some of the regions;

comparing the formed representation of the characteristics to the retrieved prestored representation; and indicating the result of the comparison.

2. A method as in claim 1 including saturating the magnetic regions with a magnetic field of substantially constant intensity.

3. A method as in claim 1 including retrieving the prestored representation from a selected location on the object.

4. A method as in claim 1 including retrieving the prestored representation from a selected location off of the object.

5. A method as in claim 1 including processing the detected randomly variable characteristics and forming a present composite representation thereof based on detected characteristics from at least two different regions.

6. A method as in claim 5 including comparing the present representation with the prestored representation.

7. A method as in claim 6 including indicating that the object is authentic where the comparing step discloses a correspondence between the two representations.

8. A method as in claim 2 with the detecting step including forming the representation subsequent to the saturating step.

9. A method as in claim 2 with the first and second edges being substantially linear.

10. A method as in claim 2 with the processing step including detecting a plurality of generated peak values with each peak value associated with a respective edge of a respective magnetic region and with some of the peak values associated with different magnetic regions.

11. A method as in claim 10 including forming a composite representation from a selected plurality of peak detected values, at least some of which are associated with different magnetic regions.

12. A method as in claim 2 with each magnetic region being diamond shaped.

13. An apparatus for verifying the authenticity of an object which carries a plurality of spaced substantially identically shaped magnetic security regions thereon with each region having a measurable unique, randomly variable characteristic and with selected of the regions having at least first and second non-parallel edges selectively oriented with respect to one another, the apparatus comprising:
   means for detecting and generating first and second electrical signals in response to first and second selectively oriented edges of at least some of the spaced magnetic security regions with each said pair of electrical signals corresponding to a representation of the unique characteristic of the respective region;
   means for retrieving a prestored, composite representation of the unique magnetic characteristics of at least some of the regions associated with the object;
   means for forming an object identifying characteristic from at least one of said electrical signals; and
   means for comparing said formed characteristic of the magnetic regions to said retrieved prestored representation and for indicating a result of the comparison.

14. An apparatus as in claim 13 with said detecting means including:
   means for sensing peak values of electrical signals generated from the detected magnetic security regions.

15. An apparatus as in claim 13 with said detecting means including means for processing the sensed characteristics and for selecting a plurality of peak values for forming a composite representation thereof.

16. An apparatus as in claim 13 wherein said retrieving means includes means for sensing said prestored representation at a selected location on the object.

17. An apparatus as in claim 13 wherein said retrieving means includes means for sensing said prestored representation at a selected location remote from the object.

18. An apparatus as in claim 13 including means for processing said detected characteristics and for forming a present composite representation thereof based on peak values of said detected characteristics from at least two different magnetic regions.

19. An apparatus as in claim 18 with said processing means including means for accumulating a plurality of digital values corresponding to peak values of said characteristics from at least two different regions.

20. An apparatus as in claim 13 with said comparing means including means for testing for a correspondence between said detected characteristics and said prestored representation.

21. An apparatus as in claim 20 including means for generating a selected indicium in response to said testing means finding said correspondence between said detected characteristics and said prestored representation.

22. An apparatus as in claim 13 including means for converting the detected magnetic characteristics to a time varying electrical signal in response to relative motion between the magnetic regions and said detecting means.

23. An apparatus as in claim 22 including means for collecting a sequence of peak values of said electrical signal from at least two different magnetic regions as well as means for forming an identifying profile for the object.

24. An apparatus as in claim 22 including means for saturating the magnetic regions and including means for collecting a sequence of saturation peak values from said spaced apart regions as well as means for forming an identifying profile for the object.

25. An apparatus as in claim 24 including means for comparing said profile to said prestored representation and means for indicating a correspondence therebetween.

26. An apparatus as in claim 22 including means for selecting a plurality of peak values of said electrical signal from at least two spaced apart regions and for forming a composite representation based on said selected plurality of peak values.

27. An apparatus as in claim 26 wherein said means for retrieving includes means for optically sensing a representation carried on the 28. An apparatus as in claim 27 with said optically sensing means including a bar code reader.

29. A method of making a verifiable object comprising:
   providing a base portion;
   providing a plurality of spaced apart, substantially identically shaped regions of magnetic material on the base portion with each region having a measurable unique, randomly variable characteristic and with selected of the regions having at least first and second non-parallel edges selectively oriented with respect to one another;
   detecting first and second magnetic characteristics from first and second different orientations with respect to each of at least two spaced apart regions;
   forming a unique representation of the detected characteristics; and
   storing the unique representation for later reference.

30. A method as in claim 29 including prior to the detecting step, saturating the spaced apart magnetic regions.

31. A method as in claim 29 including providing a flexible base portion.

32. A method as in claim 29 including providing a base portion transmissive of radiant 33. A method as in claim 29 including providing a base portion opaque to radiant energy.

34. A method as in claim 28 including depositing the regions of magnetic material on the base portion in the form of spaced apart diamonds.

35. A method as in claim 29 including printing the spaced apart magnetic regions in magnetic ink.

36. A method as in claim 35 including recording the unique representation in optically readable form on the object.

37. A method as in claim 36 including sensing selected peak values of said detected magnetic characteristics and forming the unique representation based on peak values from at least two different spaced apart regions.

38. A method of making a verifiable object comprising:
   providing a base portion;

providing a plurality of spaced apart, substantially identically shaped regions of magnetic material on the base portion with each region having measurable unique, randomly variable characteristic;

detecting first and second magnetic characteristics from first and second non-parallel orientations of each of at least two selected, spaced apart regions;

forming a unique representation of the detected characteristics; and storing the unique representation for later reference.

39. A verifiable object comprising:
a base portion; and
a plurality of spaced apart, substantially identically shaped regions of magnetic material on said base portion, said regions each including a unique, random magnetic characteristic detectable from, two non-parallel orientations with a preformed representation of said characteristics carried on said object.

40. An object as in claim 39 with said regions spaced equidistant from one another.

41. An object as in claim 39 with said regions formed of diamond shaped magnetic material.

42. An object as in claim 41 with said magnetic material deposited as magnetic ink.

43. An object as in claim 41 with said preformed representation formed of machine readable optical symbols carried by the object.

44. An object as in claim 43 with said machine readable symbols interposed, at least in part, between at least some of said magnetic regions.

45. An object as in claim 39 with said regions of magnetic material all having essentially the same coercivity.

46. An object as in claim 39 with said regions formed spaced-apart in a continuously extending magnetic region.

47. A verifiable object comprising:
a base portion; and
a plurality of spaced apart, diamond shaped regions of magnetic material on said base portion, said regions each including a magnetic characteristic detectable from two different orientations with a preformed representation of said characteristics carried on said object
with each said orientation corresponding to a respective selected first and second edge of one of said diamond shaped magnetic regions.

48. An object as in claim 47 with said first and said second characteristics being interrelated such that an alteration of one of said characteristics affects the other.

49. A method of verifying the authenticity of an object carrying a plurality of spaced apart, magnetic security regions with each region having a measurable unique, randomly variable characteristic comprising:
passing the magnetic regions through an essentially constant magnetic field;
sensing, from two non-parallel orientations, a magnetic characteristic of each member of the plurality;
selecting a predetermined set of values corresponding to sensed magnetic characteristics from various members of the plurality;
forming a representative profile based on the set of values; and
storing the representative profile for later use.

50. A method as in claim 49 including selecting a set of peak values.

51. A method as in claim 49 with the forming step including selecting a plurality of peak sensed values from said first and second orientations.

52. A validator apparatus, usable to verify the authenticity of a selected object, carrying a plurality of spaced apart magnetic security regions with each region having a measurable unique, randomly variable characteristic, the validator comprising:
means for generating electrical signals proportional to first and second non-parallel oriented magnetic characteristics of each of the spaced apart regions;
means for forming a composite profile based on at least part of one said electrical signals;
means for retrieving a prestored composite profile based on one or more previously generated electrical signals;
means for comparing the formed composite profile with the retrieved, prestored composite profile; and
means for indicating the results of said comparison.

53. A method of forming a representative profile of an object carrying a plurality of spaced apart, substantially identically shaped magnetic security regions each having a unique, random magnetic characteristic detectable from first and second orientations, the method comprising:
providing the magnetic regions;
detecting the characteristics of each of the magnetic regions from two non-parallel orientations st least once; and
collecting at least a first plurality of spaced apart peak values of selected of said detected magnetic characteristics.

54. An authenticated object comprising:
a substrate;
a plurality of spaced apart, substantially identically shaped magnetic regions on said substrate, each said region having first and second delineating portions with said first portion having a selected non-parallel orientation with respect to a respective said second portion, elated first and second electrical signals being generatable in response to detection thereof such that modification of said region will effect at least one of said signals; and
a representation of at least part of one of said signals carried by said substrate.

55. An authenticatable object comprising:
a substrate; and
a plurality of spaced apart, substantially identically shaped magnetic security regions on said substrate, each said region having at least first and second delineating edges with said edges intersecting at an angle selected from a range between 35 degrees and 45 degrees with related first and second electrical signals being generatable in response to detection thereof such that modification of said region will effect at least one of said signals.

56. An authenticatable object as in claim 55 with said edges being substantially linear.

57. An authenticable object as in claim 55 with each said region being diamond shaped.

58. An authenticatable object as in claim 55 with said regions defined in a continuously extending, recordable magnetic region.

59. An apparatus for verifying the authenticity of an object with a base portion that carries a plurality of spaced-apart magnetic regions, each of the regions includes a unique, randomly variable magnetic characteristic detectable from two non-parallel orientations with a preformed magnetic characteristic identifier carried on the base portion, the apparatus comprising:

first means for detecting the magnetic characteristic of each member of a selected group of regions carried on the same base portion from a first orientation and for generating a first electrical signal corresponding thereto;

second means for detecting the magnetic characteristic of each member of a selected group of regions carried on the same base portion from a second orientation and for generating a second electrical signal corresponding thereto with said first and said second electrical signals each indicative of the same magnetic characteristic of the sample region;

means for processing said first and said second electrical signals to generate a magnetic characteristic identifier based on relative peak values of said signals;

means for sensing the preformed magnetic characteristic identifier carried on the base portion; and means for comparing said sensed, preformed characteristic identifier to said generated characteristic identifier.

60. An apparatus as in claim 59 with said first orientation of said first detecting means and said second orientation of said second detecting means oriented at a selected angle with respect to one another.

61. A method of verifying the authenticity of an object which has a plurality of spaced apart security regions of magnetic material formed of randomly dispersed and randomly oriented magnetic particles thereon with each region having a unique, detectable magnetic characteristic resulting therefrom and with each region containing at least two substantially similar surfaces of incidence displaced from one another at a predetermined angle, the method comprising:

generating an electrical signal associated with the magnetic characteristic as detected at the first surface of incidence of each of at least some of the regions;

generating an electrical signal associated with the magnetic characteristic as detected at the second surface of incidence of each of at least some of the regions;

processing relative peak values of the electrical signals so as to form a representation of the detected magnetic characteristic based on selected slope directions.

62. An apparatus for verifying the authenicity of an object which has a plurality of spaced apart substantially identically shaped security regions thereon, each security region formed of a plurality of randomly oriented magnetic particles and with each security region having a unique, detectable magnetic characteristic resulting therefrom, each region having first and second substantially similar detection edges oriented at a selected angle with respect to one another, the apparatus comprising:

means for generating a first electrical signal representative of the magnetic characteristic of one or more of the regions sensed with respect to the first detection edge of each respective region;

means for generating a second electrical signal representative of the magnetic characteristic of the one or more regions sensed with respect to the second detection edge of each region; and means for processing relative peak amplitudes of said first and said second electrical signals.

63. An apparatus as in claim 62 with said processing means including means for forming a representation of the magnetic characteristics of the one or more regions based on relative slopes between selected peak signal values.

64. An apparatus as in claim 63 with the object carrying a representation of the magnetic security characteristic recorded thereon, the apparatus further including means for sensing said recorded representation.

65. An apparatus as in claim 64 including means for comparing said sensed representation to said formed representation.

* * * * *

UNITED STATES PATENT AND TRADEMARK OFFICE
CERTIFICATE OF CORRECTION

PATENT NO. : 4,906,988
DATED : March 6, 1990
INVENTOR(S) : Robert A. Copella

It is certified that error appears in the above-identified patent and that said Letters Patent is hereby corrected as shown below:

Column 32, line 24:

After the word "the", insert --object.--

Column 34, line 29:

After the word "orientations" delete "st" and insert --at--.

Signed and Sealed this

Sixteenth Day of July, 1991

Attest:

HARRY F. MANBECK, JR.

*Attesting Officer*     *Commissioner of Patents and Trademarks*